(12) United States Patent
Deguchi et al.

(10) Patent No.: US 7,529,899 B2
(45) Date of Patent: May 5, 2009

(54) STORAGE APPARATUS AND CONTROL METHOD THEREOF

(75) Inventors: Makoto Deguchi, Odawara (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 260 days.

(21) Appl. No.: 11/384,252

(22) Filed: Mar. 21, 2006

(65) Prior Publication Data

US 2007/0174567 A1 Jul. 26, 2007

(30) Foreign Application Priority Data

Jan. 25, 2006 (JP) .............................. 2006-016390

(51) Int. Cl.
*G06F 13/00* (2006.01)
*G06F 13/28* (2006.01)

(52) U.S. Cl. ........................ 711/162; 711/154; 711/161

(58) Field of Classification Search ........................ None
See application file for complete search history.

(56) References Cited

U.S. PATENT DOCUMENTS 7,181,583 B2 * 2/2007 Saika .......................... 711/162

2005/0210209 A1 * 9/2005 Nagata ........................ 711/162
2005/0228944 A1 10/2005 Homma et al.
2007/0168629 A1 * 7/2007 Mogi et al. .................. 711/162

FOREIGN PATENT DOCUMENTS

JP 2005-301628 10/2005

* cited by examiner

*Primary Examiner*—Kevin Verbrugge
*Assistant Examiner*—Eric S Cardwell
(74) *Attorney, Agent, or Firm*—Antonelli, Terry, Stout & Kraus, LLP.

(57) ABSTRACT

This storage apparatus has a controller for controlling, upon receiving a read request regarding data of the snapshot image of a prescribed generation from the host system, the reading of the data of the operational volume or the differential data of the pool volume as data of a snapshot image of a corresponding generation based on the generation of the snapshot and the storage destination of data of the snapshot image managed by the snapshot management unit; wherein the controller performs control so as to store the data stored in the operational volume as replication data in the pool volume when reading the data from the operational volume, and read the replication data stored in the pool volume when rereading the data stored in the operational volume.

18 Claims, 13 Drawing Sheets

FIG.4

| OPERATIONAL VOLUME BLOCK ADDRESS | FIRST GENERATION VIRTUAL VOLUME BLOCK ADDRESS | SECOND GENERATION VIRTUAL VOLUME BLOCK ADDRESS | ... | $n^{th}$ GENERATION VIRTUAL VOLUME BLOCK ADDRESS |
|---|---|---|---|---|
| 0 | 0 | 0 | ... | 0 |
| 1 | 1 | 2 | ... | NONE |
| 2 | NONE | NONE | ... | NONE |
| . . . | . . . | . . . | . . . | . . . |
| m-1 | NONE | NONE | ... | NONE |

STORAGE APPARATUS AND CONTROL METHOD THEREOF

CROSS-REFERENCES TO RELATED APPLICATIONS

This application relates to and claims priority from Japanese Patent Application No. 2006-016390, filed on Jan. 25, 2006, the entire disclosure of which is incorporated herein by reference.

BACKGROUND

The present invention relates to a storage apparatus and control method thereof, and, for example, is suitably applied to a storage apparatus that provides data of a snapshot image of an arbitrary generation to a host system.

In recent years, a storage apparatus for managing a snapshot image of a plurality of generations by acquiring a snapshot image of an operational volume at a certain point in time, storing past data (differential data) when data is to be stored in the operational volume and information representing the generation of such snapshot image in a data retention unit after the point in time when such snapshot image is acquired, and reading the read source of data of the snapshot image of the generation to be read by switching it to the operational volume or data retention unit is becoming widely used.

Further, in recent years, as described in Japanese Patent Laid-Open Publication No. 2005-301628 for instance, proposed is a storage apparatus having a control processor for controlling differential data by controlling the reading and writing of data from and into an operational volume created with a storage area of a plurality of disk drives, and controlling the writing of past data stored in the operational volume as differential data per generation in a pool volume, wherein, when the data volume stored in the pool volume exceeds a first prescribed value, the generation of the differential data to be deleted among the differential data written in the pool volume is determined, and the differential data of the determined generation is deleted.

Nevertheless, with the foregoing storage apparatus, since data transmitted from the host system is written in the operational volume, and the data of the snapshot image is read from the operational volume, the access load on the operational volume will increase.

In addition, when acquiring a plurality of snapshot images and reading the data of a plurality of snapshot images from the operational volume as with the foregoing storage apparatus, the access load on the operational volume will increase even more.

SUMMARY

The present invention was devised in view of the foregoing problems, and an object thereof is to provide a storage apparatus and control method thereof capable of dramatically reducing the access load on the operational volume.

In order to achieve the foregoing object, the present invention provides a storage apparatus having an operational volume for storing data transmitted from a host system, and a pool volume for storing differential data as data before update when the data is to be stored in the operational volume after acquiring a snapshot image of the operational volume, including: a snapshot acquisition unit for acquiring the snapshot image of the operational volume at a prescribed timing; a snapshot management unit for managing the generation of the snapshot image acquired with the snapshot acquisition unit and the storage destination of data of the snapshot image; and a controller for controlling, upon receiving a read request regarding data of the snapshot image of a prescribed generation from the host system, the reading of the data of the operational volume or the differential data of the pool volume as data of a snapshot image of a corresponding generation based on the generation of the snapshot and the storage destination of data of the snapshot image managed by the snapshot management unit; wherein the controller performs control so as to store the data stored in the operational volume as replication data in the pool volume when reading the data from the operational volume, and read the replication data stored in the pool volume when rereading the data stored in the operational volume.

Therefore, since data to be read of a snapshot image of a generation corresponding to a read request from a host system stored in an operational volume is read from a pool volume, it is possible to effectively prevent the increase in access to the operational volume.

Further, the present invention also provides a control method of a storage apparatus having an operational volume for storing data transmitted from a host system, and a pool volume for storing differential data as data before update when the data is to be stored in the operational volume after acquiring a snapshot image of the operational volume, including: a first step for acquiring the snapshot image of the operational volume at a prescribed timing; a second step for managing the generation of the snapshot image acquired at the first step and the storage destination of data of the snapshot image; and a third step for controlling, upon receiving a read request regarding data of the snapshot image of a prescribed generation from the host system, the reading of the data of the operational volume or the differential data of the pool volume as data of a snapshot image of a corresponding generation based on the generation of the snapshot and the storage destination of data of the snapshot image managed at the second step; wherein at the third step, control is performed so as to store the data stored in the operational volume as replication data in the pool volume when reading the data from the operational volume, and read the replication data stored in the pool volume when rereading the data stored in the operational volume.

Therefore, since data to be read of a snapshot image of a generation corresponding to a read request from a host system stored in an operational volume is read from a pool volume, it is possible to effectively prevent the increase in access to the operational volume.

According to the present invention, when reading data from an operational volume, data stored in the operational volume is stored as replication data in a pool volume, and the replication data stored in the pool volume is read when rereading the data stored in the operational volume. Thus, since data to be read of a snapshot image of a generation corresponding to a read request from a host system stored in the operational volume is read from the pool volume, it is possible to effectively prevent the increase in access to the operational volume, and it is therefore possible to realize a storage apparatus and control method thereof capable of dramatically reducing the access load on the operational volume.

DESCRIPTION OF DRAWINGS

FIG. 4 is a conceptual diagram for explaining the snapshot management table;

DETAILED DESCRIPTION

An embodiment of the present invention is now described in detail with reference to the drawings.

(1) FIRST EMBODIMENT

(1-1) Configuration of Storage System 1 in First Embodiment

Figure 1:
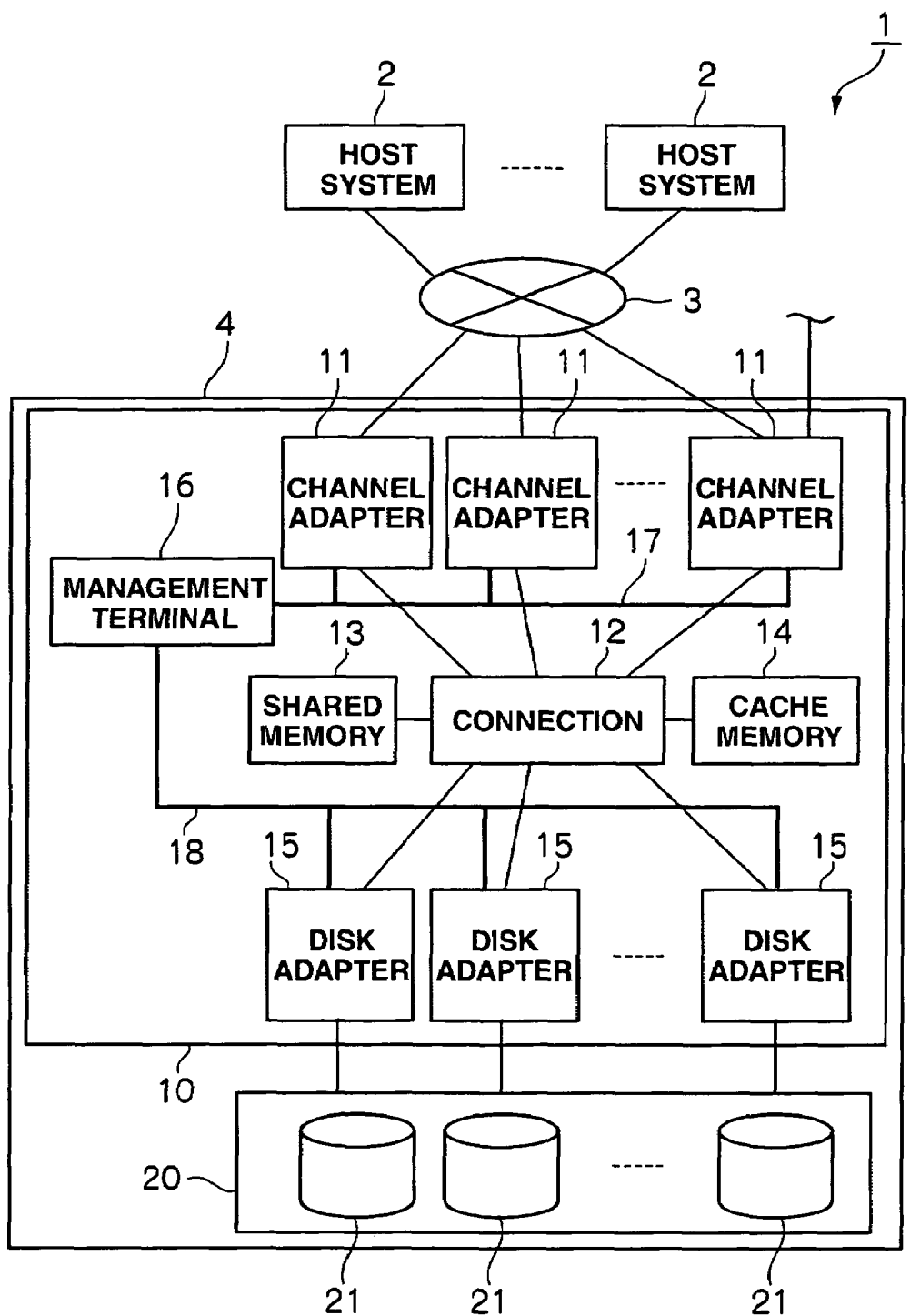
FIG. 1 is a schematic diagram showing the configuration of a storage system according to the present embodiment.

FIG. 1 shows the configuration of a storage system 1 according to the first embodiment. This storage system 1 is configured by a plurality of host systems 2 being connected to a storage apparatus 4 via a network 3.

The host system 2 as the high-level device is a computer device having information processing resources such as a CPU (Central Processing Unit) and memory, and, for instance, is configured from a personal computer, workstation, mainframe computer or the like. The host system 2 has an information input device (not shown) such as a keyboard, switch or pointing device or microphone, and an information output device (not shown) such as a monitor display or speaker.

The network 3 is configured, for example, from a SAN (Storage Area Network), LAN (Local Area Network), Internet, public line or dedicated line. Communication between the host system 2 and storage apparatus 4 via the network 3 is conducted according to a fibre channel protocol when the network 3 is a SAN, and conducted according to a TCP/IP (Transmission Control Protocol/Internet Protocol) protocol when the network 3 is a LAN.

The storage apparatus 4 is configured from a control unit 10 for controlling the input and output of data, and a storage device unit 20 formed from a plurality of disk devices 21 for storing data.

The control unit 10 is configured from a plurality of channel adapters 11, a connection 12, a shared memory 13, a cache memory 14, a plurality of disk adapters 15 and a management terminal 16.

Each channel adapter 11 is configured as a microcomputer system having a microprocessor, memory, communication interface and so on, and includes a port for connecting to the network 3 or another storage apparatus. The channel adapters 11 interpret and execute the various commands received from the host system 2 via the network 3. Each channel adapter 11 is assigned a network address (e.g., an IP address or WWN (World Wide Name)) for identifying the respective channel adapters 11, and each channel adapter 21 is thereby able to function as an individual NAS (Network Attached Storage).

The connection 12 interconnects the channel adapters 11, shared memory 13, cache memory 14 and disk adapters 15. The transfer of data and commands among the channel adapters 11, shared memory 13, cache memory 14 and disk adapters 15 is conducted via the connection 12. The connection 12, for example, may be constituted as a high-speed bus such as an ultra high-speed crossbar switch for performing data transmission based on high-speed switching operations.

The shared memory 13 and cache memory 14 are storage memories to be shared by the channel adapters 11 and disk adapters 15. The shared memory 13 is primarily used for storing the system configuration information relating to the overall configuration of the storage apparatus 4, various programs, various tables, and commands such as write requests and read requests. Further, the cache memory 14 is primarily used for temporarily storing data to be written in or read from the storage apparatus 4.

Each disk adapter 15 is configured as a microcomputer processor having a microprocessor, memory and so on, and functions as an interface for performing protocol control during communication with the disk device 21 in the storage device unit 20. These disk adapters 15, for instance, are connected to the corresponding disk device 21 in the storage device unit 20 via a fibre channel cable, and the transfer of data to and from the disk device 21 is conducted according to the fibre channel protocol.

The management terminal 16 is a terminal device for controlling the overall operation of the storage apparatus 4, and, for example is configured from a laptop personal computer. The management terminal 16 is connected to the respective channel adapters 11 via a LAN 17, and connected to the respective disk adapters 15A via a LAN 18. The operator is able to define system configuration information using the management terminal 16, and is also able to store this defined system configuration information in the shared memory 13 via the channel adapter 11 or disk adapter 15 and the connection 12.

Meanwhile, as the disk device 21 of the storage device unit 20, for example, expensive disks such as a SCSI (Small Computer System Interface) disk, or inexpensive disks such as a SATA (Serial AT Attachment) disk or optical disk may be used.

Each disk device 21 of the storage device unit 20 is operated by the control unit 10 according to the RAID system. One or more logical volumes (this is hereinafter referred to as a "logical volume") are configured on a physical storage area provided by one or more disk devices 21. And data is stored in block (this is hereinafter referred to as a "logical block") units of a prescribed size in the logical volume.

A unique identifier (this is hereinafter referred to as a "LUN (Logical Unit Number)) is given to each logical volume. In the case of this embodiment, the input and output of data is conducted upon designating an address, which is a combination of this LUN and a number unique to a logical block (LBA: Logical Block Address) given to each logical block.

Here, the flow of input and output of data between the host system 2 and storage apparatus 4 in this storage system 1 is explained. When a command for writing data in a logical volume configured in the storage apparatus 4 is input based on the user's operation, the host system 2 transmits the corresponding data write request and data to be written to a prescribed channel adapter 11 of the storage apparatus 4. The data write request contains a virtual address to which data is to be written and is formed by combining a virtual LU given to each logical volume configured in the storage areas respectively provided by the storage apparatus 4, and a virtual LBA numbered serially to all logical blocks in the storage area.

The channel adapter 11 of the storage apparatus 4 that received this data write request changes a virtual address, to which data designated in the data write request is to be written, into an actual address that is being recognized by the storage apparatus 4. As the means for this, the shared memory of the storage apparatus 4 stores an address mapping table associating the actual address of the storage area provided by the storage apparatus 4 and the virtual address of the storage area that is being recognized by the host system 2. Then, the channel adapter 11 refers to this address mapping table and rewrites the virtual address, to which data contained in the data write request is to be written, into the actual address to be recognized by the storage apparatus 4.

Then, the channel adapter 11 writes this rewritten data write request in the shared memory 13. Further, the channel adapter 11 writes this [data write request] together with the data to be written in the cache memory 14.

Here, the disk adapter 15 is constantly monitoring the shared memory 13. And when the corresponding disk adapter 15 detects that the data write request has been written in the shared memory 13, it converts a data write request designated by a virtual logical address into a data write request designated by an actual physical address, reads the data to be written from the cache memory 14, and writes this in the corresponding address position of the corresponding disk device 15.

Meanwhile, when a command for reading data stored in a prescribed logical volume in the storage apparatus 4 is input based on the user's operation, the host system 2 transmits the corresponding data read request to a prescribed channel adapter 11 of the storage apparatus 4. Here, the data read request contains a virtual address of the position to which the data to be read is written.

The channel adapter 11 of the storage apparatus 4 that received this data read request rewrites a virtual address of reading data contained in the data read request into an actual address that is being recognized by the storage apparatus 4.

Then, the channel adapter 11 writes this rewritten data read request in the shared memory 13. Further, when the corresponding disk adapter 15 detects that a read command has been written in the shared memory 13, it converts a data read request designated by a logical address into a data read request designated by a physical address, and reads the data designated from the corresponding address position of the corresponding disk device 20 based on this address.

Further, the disk adapter 15 writes the data read from the disk device 20 in the cache memory 14, and writes the read command in the shared memory 13. Here, the channel adapter 11 is constantly monitoring the shared memory 13, and, when the [channel adapter 11] detects that a read command has been written in the shared memory 13, it reads the corresponding data from the cache memory 14 according to this read command, and transmits this to the corresponding host system 2 via the network 3.

Like this, with the storage system 1, data transmitted from the host system 2 according to the data I/O request transmitted from the host system 2 can be read from and written into a storage area provided by the storage apparatus 4.

(1-2) Snapshot Image Acquisition Processing in First Embodiment

Next, the snapshot image acquisition processing in the storage system 1 according to the first embodiment is explained.

Figure 2:
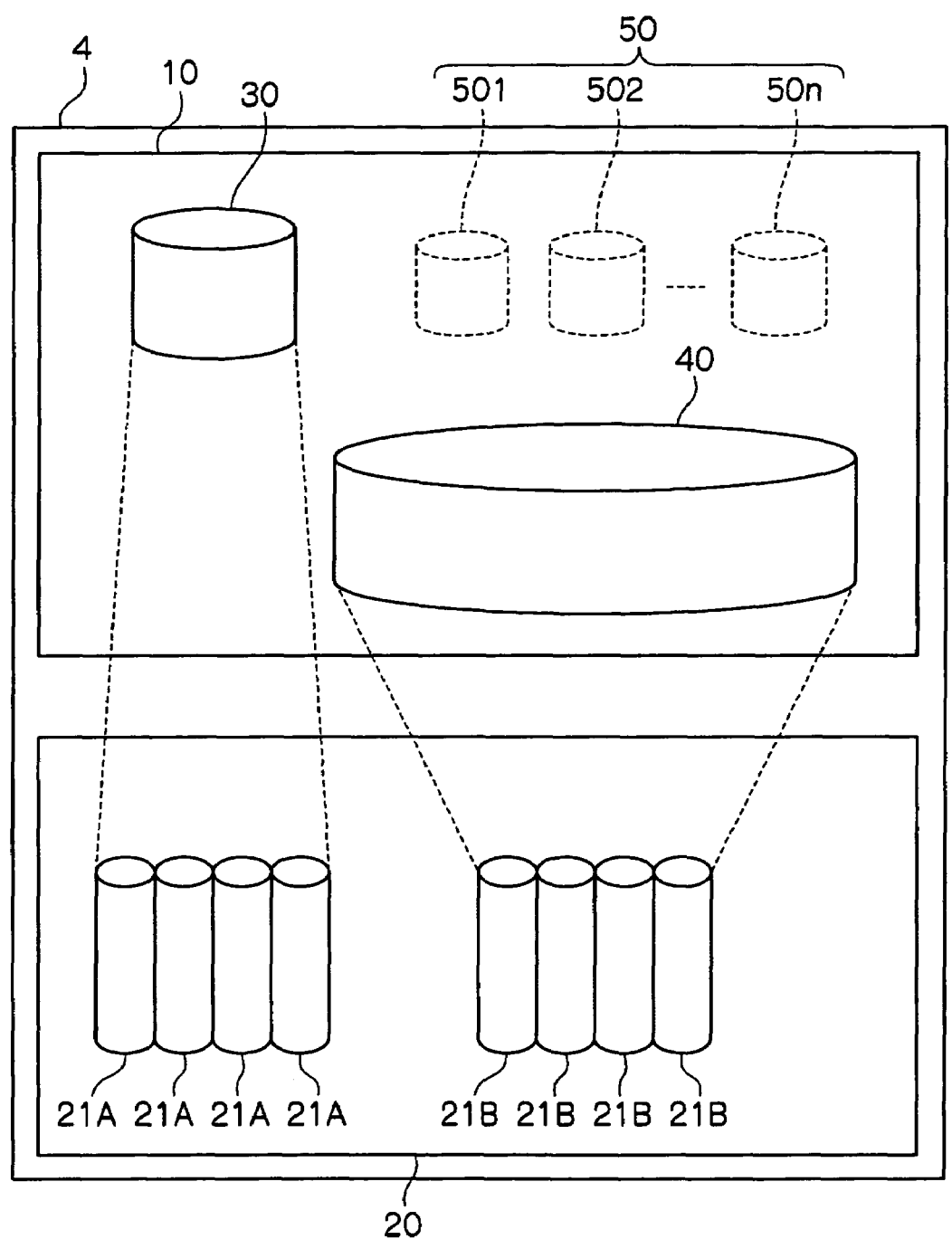
FIG. 2 is a schematic diagram showing the configuration of a logical volume.

FIG. 2 shows the logical volume to be configured in the storage device unit 20. The logical volume, as shown in FIG. 2, is configured from an operational volume 30 for storing data transmitted from the host system 2, a pool volume 40 for acquiring a snapshot image of the operational volume 30 at a certain point in time and storing the data before update (this is hereinafter referred to as "differential data") when data is to be stored in the operational volume 30 after acquiring the snapshot image, and a virtual volume 50 for providing the snapshot image acquired from the operational volume 30 to the host system 2 per generation.

In this case, the operational volume 30, as shown in FIG. 2, is configured from four disk devices 21A, and, for example, is operated according to a RAID 5 system. Further, the pool volume 40 is configured from four disk devices 21B that are different from the disk devices 21A of the operational volume 30, and is similarly operated according to the RAID 5 system as with the operational volume. Incidentally, the disk devices 21A and disk devices 21B are indicated with "A" and "B" to show that the operational volume and pool volume are configured from separate disk devices, but these are all disk devices 21.

Like this, with the storage system 1, as a result of configuring the disk devices of the operational volume 30 and the disk devices of the pool volume 40 from separate disk devices 21A and disk devices 21B, even when the reading and writing of data is being performing in the operational volume 30, it is possible to perform the reading and writing of data in the pool volume 40.

Incidentally, in this embodiment, although a case was explained where the operational volume 30 and pool volume 40 are operated according to the RAID 5 system, the present invention is not limited thereto, and, for example, various types of RAID systems such as RAID 1 may also be used, and systems other than the RAID system may also be used.

Here, the virtual volume 50 is a virtual volume formed from the disk devices 21 in one or more storage devices 20, and is actually configured from some blocks in the operational volume 30 and some blocks in the differential volume 40. Further, the operational volume 30 and the respective virtual volumes 50 are respectively configured in pairs.

Incidentally, in the following explanation, the first generation virtual volume, second generation virtual volume and virtual volume of generation n in the first storage apparatus 4 are referred to as a first generation virtual volume 50₁, a second generation virtual volume 50₂, and a generation n virtual volume 50n, respectively.

Figure 3:
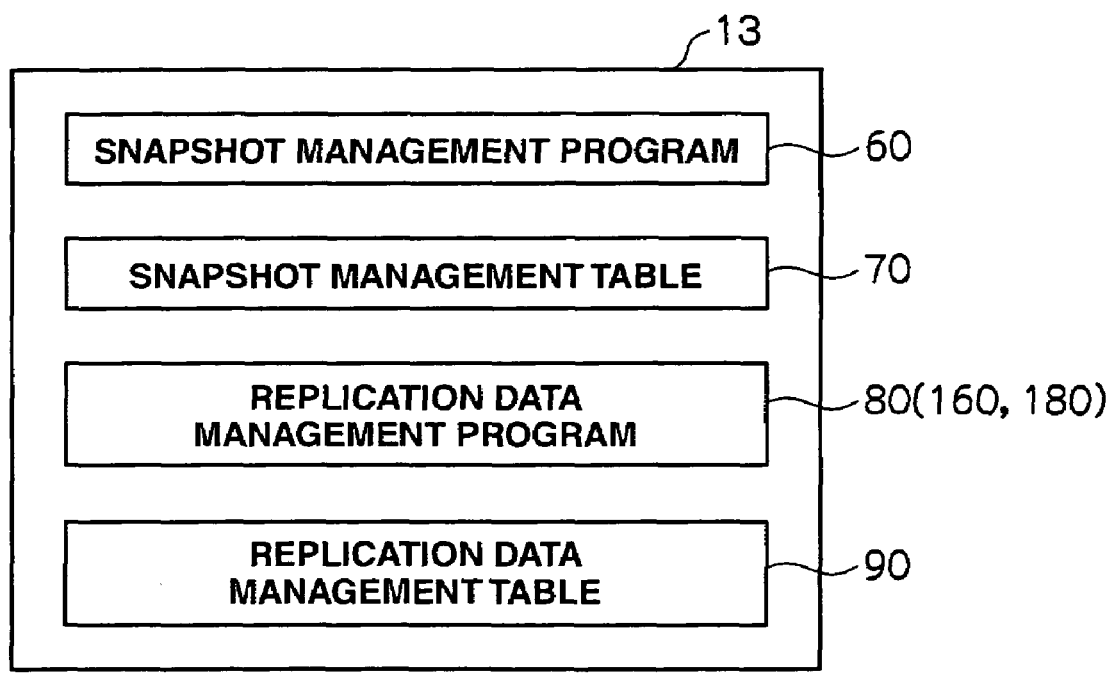
FIG. 3 is a schematic diagram showing the configuration of a shared memory.

Further, the shared memory 13, as shown in FIG. 3, stores a snapshot management program 60 and a replication data management program 70, and the various processes are performed by the disk adapter 15 calling and executing the snapshot management program 60 and replication data management program 70. Moreover, the shared memory 13 stores a snapshot management table 80 and a replication data management table 90 (described later).

In this case, when the disk adapter 15 receives an acquisition request of a snapshot image from the host system 2, it acquires the snapshot image of the operational volume 30 of the storage device unit 20.

Then, based on the snapshot management program 60, with the use of the snapshot management table 80, the disk adapter 15 manages the data stored in the operational volume 30 and pool volume 40 to become accessible as data stored in the operational volume 30 at the time of receiving the acquisition request of the snapshot image, and makes the virtual volume 50 for providing the snapshot image of the acquired operational volume 30 be accessible.

Further, the disk adapter 15, in addition to the logical volume (operational volume 30) storing file systems and the like, manages the logical volume (pool volume 40) for storing differential data; that is, differential data required for maintaining the snapshot, performs data I/O processing according to the request from the host system 2, performs processing for maintaining the snapshot image, and performs processing for enabling the use of the snapshot image.

Specifically, when the disk adapter 15 receives an acquisition request of a snapshot image, foremost, it registers identifying information of the virtual volume 50 of a new generation in the snapshot management table 80. Blocks of this virtual volume 50 are initially associated one-on-one to the block addresses of the operational volume 30 based on the snapshot management table 80.

Further, when the data in the operational volume 30 is to be updated thereafter, the disk adapter 15 copies the data before update (differential data) in the operational volume 30 to the pool volume 40, and, after such copying, updates the stored contents of the operational volume 30.

Then, the disk adapter 15 further updates the snapshot management table 80 so as to associate the block address in the virtual volume corresponding to the block in the operational volume storing updated data with the block in the pool volume 40 storing data (i.e., data before update (differential data)) that was stored in the operational volume 30 at the time of receiving an acquisition request of a snapshot image.

Meanwhile, when the disk adapter 15 receives an access request to the virtual volume 50 from the host system 2, it refers to the snapshot management table 80 and instructs the host system 2 to access the block of the operational volume 30 associated with the block address of the virtual volume 50, or the block address of the pool volume 40.

Therefore, the host system 2 is able to use information in the operational volume 30 at the time the acquisition request of the snapshot image was issued by accessing the virtual volume 50. Thus, with the storage apparatus 4, it is possible to provide a snapshot image of a file system. Incidentally, these processes will be explained in detail later.

FIG. 4 is an explanatory diagram of the snapshot management table 80. The snapshot management table 80 shown in FIG. 4 is configured from an operational volume block address storage column 81 storing the block address of the operational volume 30, and first to $n^{th}$ generation virtual volume block address storage columns 821 to 82$n$ storing the block address of the pool volume 40 of the virtual volumes of the first to $n^{th}$ generations.

The operational volume block address storage column 81 has block addresses of the operational volume 30 registered therein, and the first block address number 0 of the operational volume 30 is allocated to the initial row (first row), block address number 1 of the operational volume 30 is allocated to the second row, and block addresses of the operational volume 30 are thereafter allocated in order, and the block address (m−1) of the operational volume 30 is allocated to the $m^{th}$ row, which is the last row.

The first to $n^{th}$ generation virtual volume block address storage columns 821 to 82$n$ have the storage position in the pool volume 40 of data corresponding to the respective block address of the virtual volume per generation registered therein. For example, the storage position of data of snapshot number 1 is registered in the first generation virtual volume block address storage column 821. In this case, the snapshot number and the generation number of the virtual volume 50 are the same. For example, the first generation virtual volume 501 corresponds to the snapshot number 1.

Information for identifying the storage area storing data corresponding to block address number 0 of the first generation virtual volume 501 is registered in the first row of the first generation virtual volume block address storage column 821, and, in order thereafter, storage positions of data corresponding to block address number 1 of the first generation virtual volume 501 are registered in the second row, block address number 2 is registered in the third row . . .

Specifically, number 0 registered as the storage position of data of block address number 0 of the first generation virtual volume 501 in the first row corresponds to block address number 0 of the pool volume 40.

After the disk adapter 15 receives an acquisition request of a snapshot image, it writes the data before update (differential data) stored in block address number 0 of the operational volume 30 in block address number 0 of the pool volume 40 when the data of block address number 0 of the operational volume 30 is updated, and thereafter updates the data of block address number 0 of the operational volume 30.

Here, in order to provide access to the snapshot image, the disk adapter 15 is required to store the data stored in the operational volume 30 at the time the acquisition request of the snapshot image was received in any disk device 21 in the storage device 20.

Like this, the disk adapter 15 associates, in the snapshot management table 80, block address number 0 of the operational volume 30 and block address number 0 of the pool volume 40 stored in the first generation virtual volume block address storage column 821.

Then, by accessing block address number 0 (in other words, block address number 0 of the pool volume 40) in the first row of the first generation virtual volume block address storage column 821, the disk adapter 15 is able to obtain the data before update (differential data) (data of the first generation virtual volume 501) of block address number 0 of the operational volume 30.

Therefore, when the disk adapter 15 receives an access request to block address number 0 of the first generation virtual volume, it is able to access block address number 0 of the pool volume 40 by referring to the snapshot management table 80.

As a result, the disk adapter 15 is able to provide to the host system 2 an access environment to the first generation virtual volume 501 in a state as though the data before update (differential data) of block address number 0 of the operational volume 30 (in other words, data of the first generation virtual volume 501 stored in block address number 0 of the operational volume 30 at the time of receiving an acquisition request of a snapshot image) is written in block address number 0 of the first generation virtual volume 501.

Similarly, number 1 registered as the storage position of data of the block address of the first generation virtual volume 501 in the second row of the first generation virtual volume block address storage column 821 corresponds to block address number 1 of the pool volume 40.

In this case, when the data of block address number 1 of the operational volume 30 is to be updated after receiving an acquisition request of a snapshot image, the disk adapter 15 writes the data before update (differential data) stored in block address number 1 of the operational volume 30 in block address number 1 of the pool volume 40, and thereafter updates block address number 1 of the operational volume 30.

Like this, the disk adapter 15 associates, in the snapshot management table 80, block address number 1 of the operational volume 30 and block address number 1 of the pool volume 40 stored in the first generation virtual volume block address storage column 821.

As a result, the disk adapter 15 is able to provide the host system 2 an access [environment] to the first generation virtual volume 501 in a state as though the data before update (differential data) (data of the first generation virtual volume 501) of block address number 1 of the operational volume 30 is virtually written in block address number 1 of the first generation virtual volume 501.

The third row to $m^{th}$ row store "None" as the storage position information corresponding to the $(m-1)^{th}$ data from block address number 2 of the first generation virtual volume 501. "None" shows the corresponding block address of the operational volume 30. Therefore, block addresses 2 to (m−1) of the first generation virtual volume 501 correspond to block addresses 2 to (m−1) of the operational volume 30. In other words, "None" shows that the block address of the operational volume 30 has not been updated (rewritten) after last receiving an acquisition request of a snapshot image.

Therefore, the disk adapter 15 is able to provide to the host system 2 a snapshot image (first generation virtual volume 501) of the operational volume 30 at the point in time before the data of block address number 0 and block address number 1 of the operational volume 30 is updated based on the data of block address number 0 (block address number 0 of the pool volume 40) of the first generation virtual volume 501, data of block address number 1 (block address number 1 of the pool volume 40) of the first generation virtual volume 501, and data of block addresses 2 to (m−1) of the operational volume 30.

Meanwhile, the storage position of data of the second generation virtual volume 502 is registered in the second generation virtual volume block address storage column 822.

The disk adapter 15 registers the virtual volume 50 of a new generation to acquire a new snapshot image at the time of receiving an acquisition request in the snapshot management table 80 each time an acquisition request of a snapshot image is received.

In this case, the second generation virtual volume 502 is the virtual volume 50 of the generation corresponding to snapshot number 2 (second generation) created after a snapshot (corresponding to the first generation virtual volume 501) of the snapshot number 1, and the acquisition request of the snapshot image (acquisition request of the snapshot image of the second generation virtual volume 502) is received once again.

Number 0 registered as the data storage position of block address number 0 of the second generation virtual volume 502 in the first row of the second generation virtual volume block address storage column 822 corresponds to block address number 0 of the pool volume 40.

When the data of block address number 0 of the operational volume 30 is to be updated after receiving an acquisition request of the second snapshot image, the disk adapter 15 copies the data before update (differential data) stored in block address number 0 of the operational volume 30 to block address number 0 of the pool volume 40, and, after such copying, updates the data of block address number 0 of the operational volume 30.

Here, since the disk adapter 15 has stored the data corresponding to block address number 0 of the first generation virtual volume 501 and second generation virtual volume 502 in block address number 0 of the pool volume 40, it rewrites the snapshot management table 80 so that block address number 0 of both the first generation virtual volume 501 and second generation virtual volume 502 are associated to block address number 0 of the pool volume 40.

Further, number 2 registered as the storage position of data of block address number 1 of the second generation virtual volume 502 in the second row of the second generation virtual volume block address storage column 822 corresponds to block address number 2 of the pool volume 40. This shows that the data of block address number 1 of the operational volume 30 has been updated after receiving an acquisition request of the second snapshot image.

In other words, upon updating the data of block address number 1 of the operational volume 30 created after receiving an acquisition request of the second (second generation) snapshot image, the data before update (differential data) is copied to block address number 2 of the pool volume 40. This is because if such data is copied to block address number 1 of the pool volume 40, the data associated with block address number 1 of the first generation virtual volume 501 will be changed, and the first snapshot image will be destroyed.

"None" is registered as the storage position of data of block addresses 2 to (m−1) of the second generation virtual volume 502 in the third row to $m^{th}$ row of the second generation virtual volume block address storage column 822. "None", as described above, shows that the block address of the virtual volume 50 is associated with the corresponding block address of the operational volume 30.

Explanation regarding the generation n virtual volume block address storage column 82n is the same as the first generation/second generation virtual volume block address storage columns 821, 822 described above, and the explanation thereof is omitted.

Like this, with the storage apparatus 4, it is possible to provide a virtual volume of a prescribed generation to the host system 2 by acquiring a snapshot image of such prescribed generation based on an acquisition request of a snapshot image transmitted from the host system 2, referring to the snapshot management table 80 when an access request is issued to a virtual volume (snapshot image) of a prescribed generation, and reading the data of the pool volume 40 or the data of the operational volume 30.

(1-3) Control Processing at Time of Reading Data in First Embodiment

Next, the control processing at the time of reading data in the storage system 1 according to the first embodiment is explained. With the storage system 1 according to the first embodiment, when reading data from the operational volume 30 upon receiving a read request regarding data of the snapshot image of a certain generation from the host system 2, such data is stored in the pool volume 40, and, when rereading this data, the data stored in the pool volume 40 is read.

Here, when a read request regarding data of a snapshot image of a certain generation is received from the host system 2, the data read from the operational volume 30 and stored in the pool volume 40 is referred to as "replication data".

Figure 5:
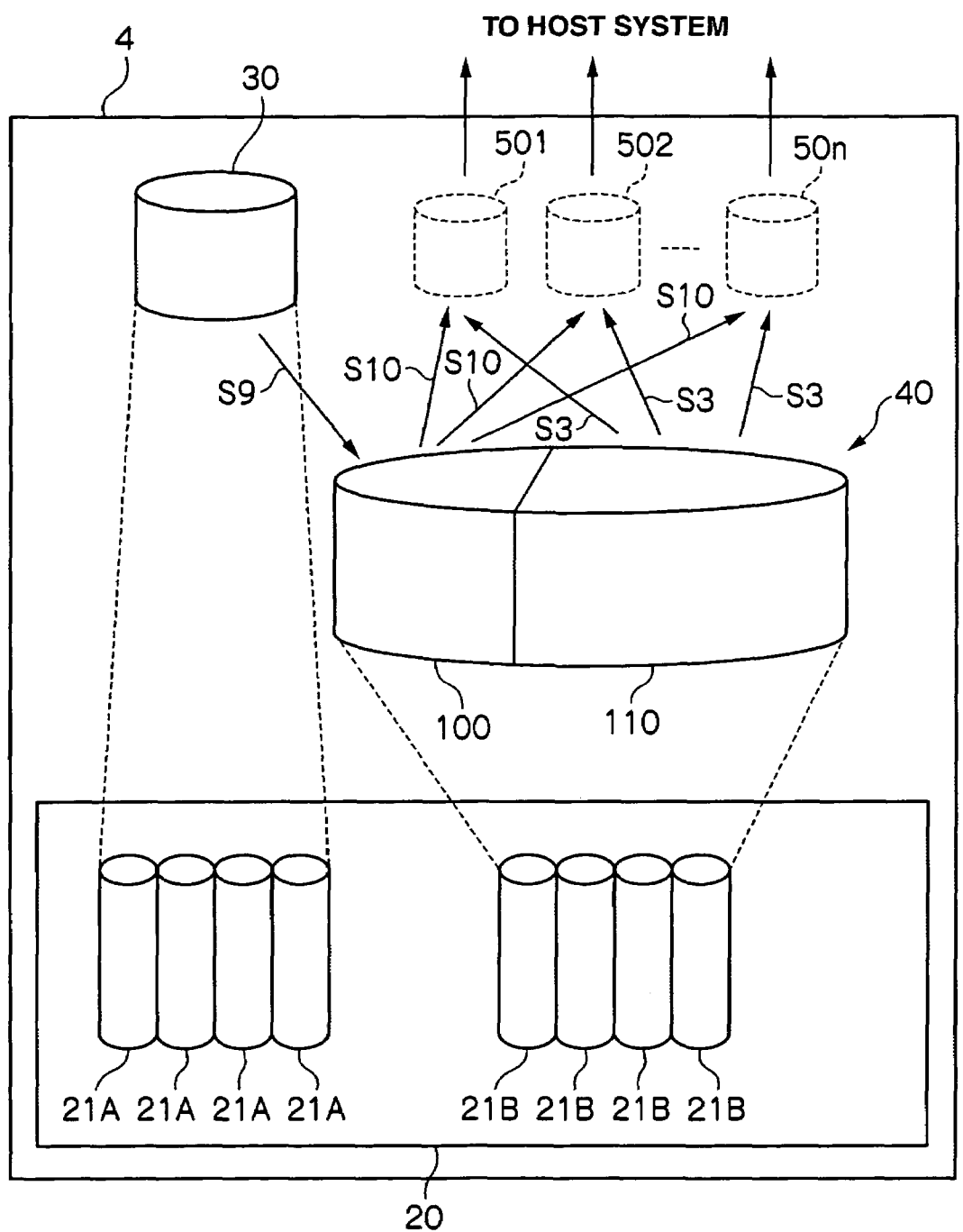
FIG. 5 is a conceptual diagram for explaining the control processing at the time of reading data according to the first embodiment.

FIG. 5 is a conceptual diagram schematically showing the contents of control processing at the time of reading data. In this case, the pool volume 40, as shown in FIG. 5, is configured from a replication data storage area 100 for storing replication data, and a differential data storage area 110 for storing differential data, and the capacity of this replication data storage area 100 is configured to be a predetermined capacity by the administrator or the like of the management terminal 16.

Incidentally, the capacity of this replication data storage area 100 can be configured to be an arbitrary capacity by the administrator or the like of the management terminal 16, and the capacity can thereby be applied to various modes of use intended by the administrator or the like.

Figure 6:
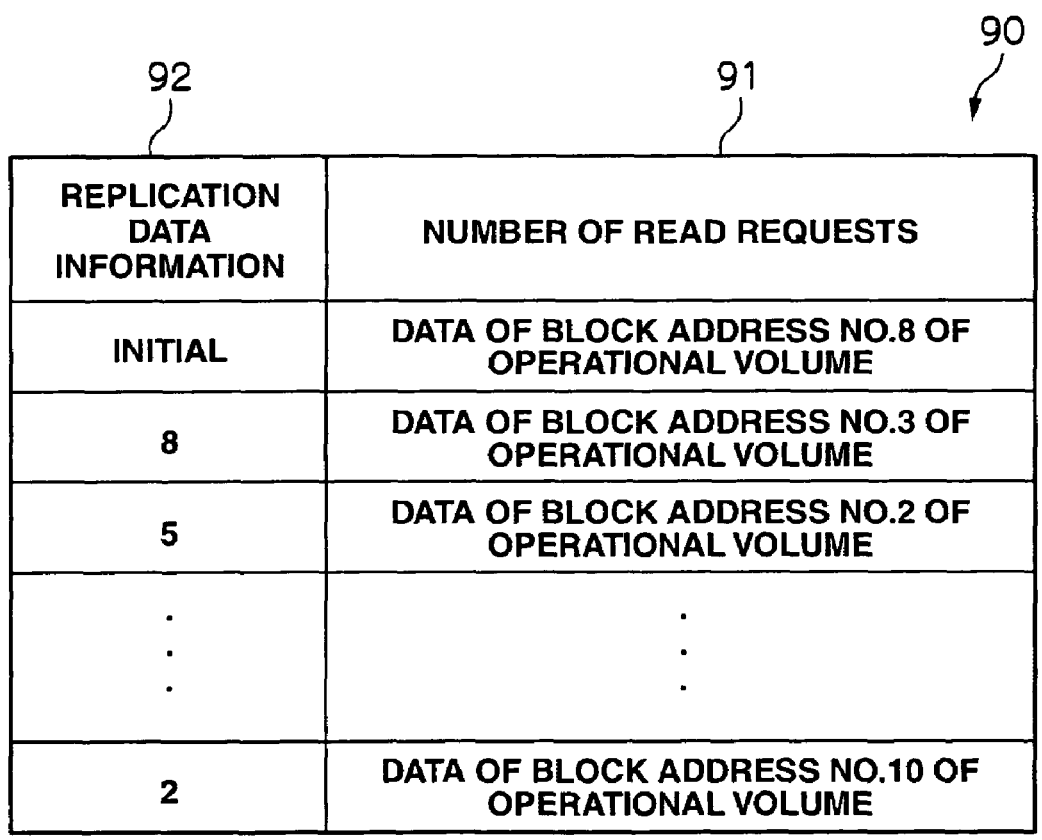
FIG. 6 is a conceptual diagram for explaining the replication data management table.

FIG. 6 is an explanatory diagram of the replication data management table 90. The replication data management table 90 shown in FIG. 6 is for managing the replication data stored in the replication data storage area 100, and is configured from a replication data information storage column 91 for storing information of the replication data stored from the operational volume 30 in the replication data storage area 100 of the pool volume 40, and a read request count storage column 92 for storing the number of times a read request was received from the host system 2 for reading the data stored in the operational volume 30.

Further, priority for each piece of information of replication data stored in the replication data information storage column 91 is configured in the replication data management table 90, and the priority of replication data is increased the more times a read request is received from the host system 2 for reading the data stored in the operational volume 30.

Moreover, the replication data management table 90 manages the replication data newly stored in the replication data storage area 100 of the pool volume 40 as replication data with the highest priority until a new replication data is subsequently stored for the first time.

In this case, the replication data management table 90, as shown in FIG. 6, stores, for instance, "Initial" in the read request count storage column 92 corresponding to the newly stored replication data. Further, when replication data is to be subsequently and newly stored in the replication data storage area 100 of the pool volume 40, the replication data management table 90 stores "Initial" in the read request count storage column 92 corresponding to this subsequently and newly stored replication data, and stores a corresponding count in the read request count storage column 92 in which "Initial" was stored theretofore.

Figure 7:
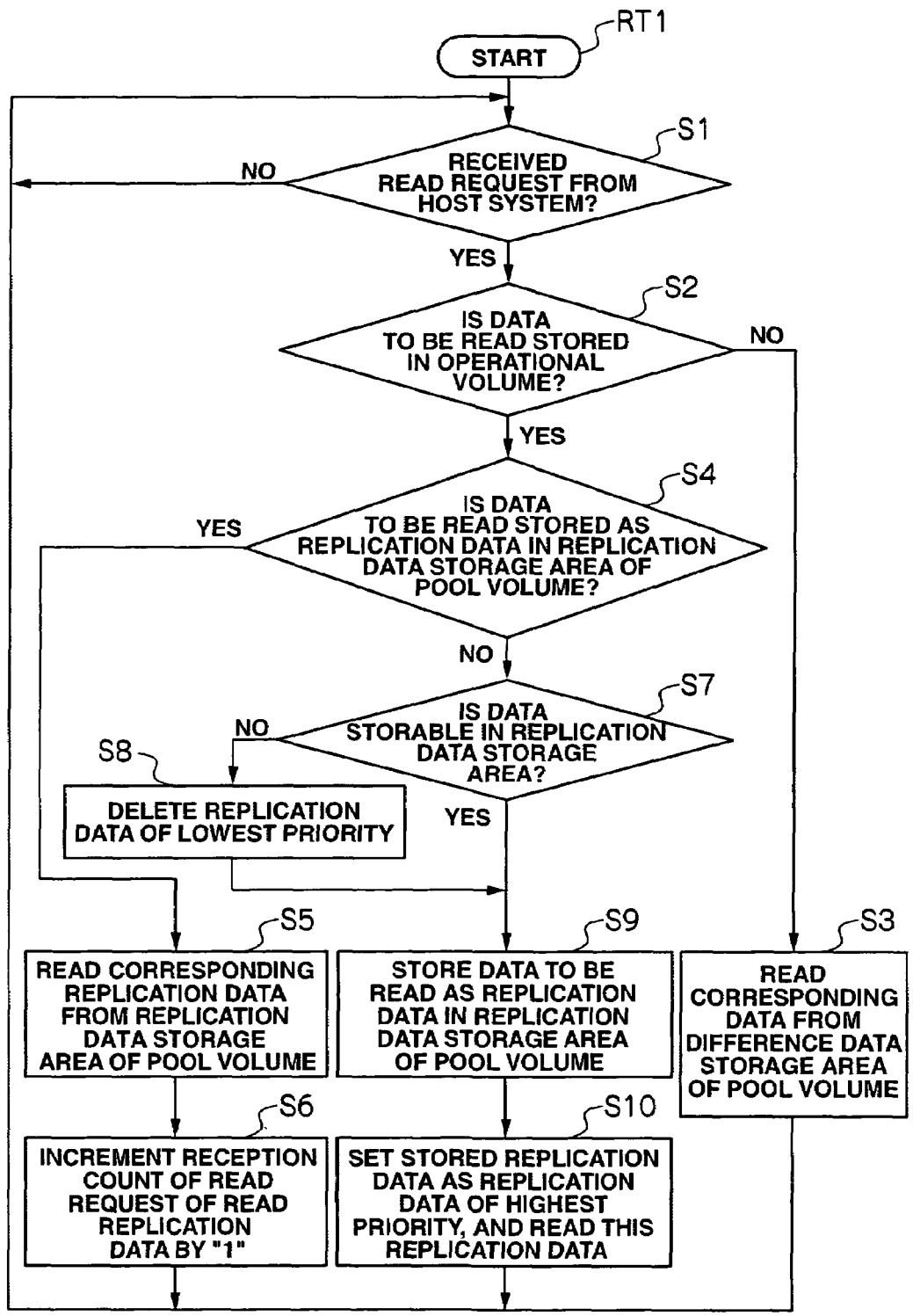
FIG. 7 is a flowchart for explaining the control processing at the time of reading data according to the first embodiment.

Here, FIG. 7 is a flowchart showing a specific processing routine of the storage apparatus 4 regarding the controller processing at the time of reading data in the storage system 1.

As a result of initially executing the replication data management program 70, the disk adapter 15 waits in standby mode for the user to operate the host system 2 and to receive a read request of data of the virtual volume 50 of a certain generation according to the first replication data management processing routine RT1 shown in FIG. 7 (S1).

When the disk adapter 15 eventually receives a read request of data of the virtual volume 50 of a certain generation from the host system 2 (S1: YES), it checks whether data to be read corresponding to the read request is stored in the operational volume 30 by referring to the snapshot management table 80 (S2).

And, when data to be read of the virtual volume 50 of a generation corresponding to a read request from the host system 2 is not stored in the operational volume 30 (S2: NO), the disk adapter 15 reads data of a number of a block address of the virtual volume 50 of a corresponding generation of the snapshot management table 80 (differential data stored in a number of a corresponding block address of the differential data storage area 110 of the pool volume 40) to the host system 2 (S3), and thereafter once again returns to standby mode and waits to receive a read request of data of the virtual volume 50 of a certain generation from the host system 2 (S1).

For example, when the disk adapter 15 receives a read request of data of block address number 1 of the first generation virtual volume 501 in the snapshot management table 80 illustrated in FIG. 4 from the host system 2, it reads the data corresponding to block address number 1 of the differential data storage area 110 of the pool volume 50 to the host system 2 since "1" is stored as the storage position of the data of block address number 1 of the first generation virtual volume 501.

Contrarily, when data to be read of the virtual volume 50 of a generation corresponding to a read request from the host system 2 is stored in the operational volume 30 (S2: YES), the disk adapter 15 checks whether data to be read of the virtual volume 50 of a generation corresponding to a read request from the host system 2 is stored as replication data in the replication data storage area 100 of the pool volume 40 (in other words, whether to newly store data to be read as replication data in the replication data storage area 100 of the pool volume 40) by referring to the replication data management table 90 (S4).

And, when data to be read of the virtual volume 50 of a generation corresponding to a read request from the host system 2 is stored as replication data in the replication data storage area 100 of the pool volume 40 (S4: YES), the disk adapter 15 reads the data of a number of a block address of the virtual volume 50 of a corresponding generation of the replication data management table 90 (replication data stored in a number of a corresponding block address pool of the replication data storage area 100 of the pool volume 40) to the host system 2 (S5).

For example, when the disk adapter 15 receives a read request of data of block address number 2 of the first generation virtual volume 501 in the snapshot management table 80 illustrated in FIG. 4 from the host system 2, it reads the data of block address number 1 of the operational volume 30 since "None" is stored as the storage position of the data of block address number 1 of the first generation virtual volume 501.

Here, the disk adapter 15 read the data of block address number 2 of the operational volume 30 stored in the replication data storage area 100 of the pool volume 40 to the host system 2 since the information of data of block address number 2 of the first generation virtual volume 501 is stored in the replication data management table 90 illustrated in FIG. 6.

Next, the disk adapter 15 increments the reception count of read requests from the host system 2 for reading data of a number of a block address of the virtual volume 50 of a corresponding generation stored in the read request count storage column 92 of the replication data management table 90 (replication data stored in a number of a corresponding block address of the replication data storage area 100 of the pool volume 40) by "1" (S6), and thereafter once again returns to standby mode and waits to receive a read request of data of the virtual volume 50 of a certain generation from the host system 2 (S1).

For example, when the disk adapter 15 reads the data of block address number 2 of the operational volume 30 stored in the replication data storage area 100 of the pool volume 40 to the host system 2, it increases the "5" stored in the read request count storage column 92 of the replication data management table 90 illustrated in FIG. 6 to "6".

Contrarily, when data to be read of the virtual volume 50 of a generation corresponding to a read request from the host system 2 is not stored as replication data in the replication data storage area 100 of the pool volume 40 (S4: NO), the disk adapter 15 checks whether the data to be read of the virtual volume 50 of a generation corresponding to a read request from the host system 2 can be stored as replication data in the replication data storage area 100 of the pool volume 40 (S7).

And, when the data to be read of the virtual volume 50 of a generation corresponding to a read request from the host system 2 cannot be stored as replication data in the replication data storage area 100 of the pool volume 40 (S7: NO), the disk adapter 15 refers to the replication data management table 90 and deletes the replication data with the lowest priority (S8).

For example, when the disk adapter 15 stores the data to be read of the virtual volume 50 of a generation corresponding to a read request from the host system 2 as replication data in the replication data storage area 100 of the pool volume 40, and this exceeds the capacity of the replication data storage area 100 predetermined by the administrator or the like of the management terminal 16, as shown in FIG. 6, it deletes the replication data with the lowest priority; that is, the data of block address 10 of the operational volume 30 stored in the replication data storage area 100 of the pool volume 40 in which the reception count of read requests from the host system 2 stored in the read request count storage column 92 of the replication data management table 90 is "1".

Contrarily, when the data to be read of the virtual volume 50 of a generation corresponding to a read request from the host system 2 can be stored as replication data in the replication data storage area 100 of the pool volume 40 (S7: YES), or the replication data with the lowest priority has been deleted by referring to the replication data management table 90 (S8), the disk adapter 15 stores such data to be read as replication data in the replication data storage area 100 of the pool volume 40 (S9).

Then, the disk adapter 15 makes the data of a number of a block address of the virtual volume 50 of a corresponding generation stored as replication data in the replication data storage area 100 of the pool volume 40 a replication data with the highest priority, reads this replication data to the host system 2 (S10), and thereafter once again returns to standby mode and waits to receive a read request of data of the virtual volume 50 of a certain generation from the host system 2 (S1).

For example, when a read request is issued by the host system 2 for reading the data of block address number 8 of the operational volume 30 as the data to be read of the virtual volume 50 of a corresponding generation, the disk adapter 15, as shown in FIG. 6, stores the data of block address number 8 of the operational volume 30 in the replication data information storage column 91, stores "Initial" in the corresponding read request storage column 92 to give highest priority to the replication data, and reads the data of block address number 8 of the operational volume 30 stored in the replication data storage area 100 of the pool volume 40 to the host system 2.

Incidentally, for example, when the replication data in which "Initial" was stored in the read request storage column 92 was the data of block address number 10 of the operational volume 30 until the data of block address number 8 of the operational volume 30 is stored in the replication data information storage column 91, the disk adapter 15, as shown in FIG. 6, stores the "1", which is the reception count of read requests from the host system 2 theretofore, in the corresponding read request storage column 92.

Like this, with the storage apparatus 4, when the data to be read of the virtual volume 50 of a generation corresponding to a read request from the host system 2 is stored in the operational volume 30, it stores the data to be read of the volume 50 of a generation corresponding to a read request from the host system 2 as replication data in the replication data storage area 100 of the pool volume 40, and, when a read request is issued from the host system 2 once again, reads the data to be read of the virtual volume 50 of a corresponding generation from the replication data storage area 100 of the pool volume 40.

Therefore, with the storage apparatus 4, since the data to be read of the virtual volume 50 of a generation corresponding to a read request from the host system 2 stored in the operational volume 30 is read from the replication data storage area 100 of the pool volume 40, it is possible to effectively prevent the increase of access to the operational volume 30, and, as a result, the access load on the operational volume can be dramatically reduced.

Specifically, this implies that by storing data of the disk drives 21A configuring the operational volume 30 in the disk drives 21B configuring the pool volume, and performing reading processing from the disk drives 21B also, the concentrated access to the disk drives 21A can be avoided.

Incidentally, processing for storing the data to be read stored in the operational volume 30 as replication data in the pool volume 40 is the processing for replicating data between volumes as the logical storage areas, and this does not have to involve the copy processing among physical disk devices configuring the operational volume 30 and pool volume 40 to be performed at S9.

In this case, specifically, after reading the data to be read from the disk drives 21A configuring the operational volume 30 into the cache memory 14 via staging processing, this is logically copied to the pool volume 40, and this read data is managed in a cache as the data copied to the pool volume 40 (if there is a read request while the read data is being staged in the cache memory 14, this read data is replied from the cache memory to the host).

Thereafter, as physical data processing, processing for storing the data to be read in the disk drives 21B configuring the pool volume 40 upon destaging such data to be read from the cache memory is performed.

Further, with the storage apparatus 4, by the administrator or the like of the management terminal 16 configuring the capacity of the replication data storage area 100 as a predetermined capacity, it is possible to unconditionally store the replication data in the pool volume 40 and compress the capacity for storing the differential data, and, therefore, it is further possible to effectively prevent a situation of not being able to store the differential data from occurring.

Moreover, with the storage apparatus 4, as a result of the replication data management table 90 managing the replication data stored in the replication data storage area 100, configuring priority for each piece of information of replication data stored in the replication data information storage column 91, and increasing the priority of the replication data the more receptions of read requests from the host system 2 for reading the data stored in the operational volume 30, based on such priority, it is possible to comprehend the frequency of reading the replication data stored in the replication data storage area 100 of the pool volume 40, and the capacity of the replication data storage area 100 of the pool volume 40 can be used effectively.

Moreover, with the storage apparatus 4, when the data to be read of the virtual volume 50 of a generation corresponding to a read request from the host system 2 cannot be stored as replication data in the replication data storage area 100 of the pool volume 40, by deleting the replication data with the lowest priority by referring to the replication data management table 90, it is possible to delete the replication data stored in the replication data storage area 100 of the pool volume 40 which is hardly read, and the capacity of the replication data storage area 100 of the pool volume 40 can be used even more effectively.

Moreover, with the storage apparatus 4, by making the replication data newly stored in the replication data storage area 100 of the pool volume 40 a replication data with the highest priority until a new replication data is subsequently stored for the first time, it is possible to read the data to be read of the virtual volume 50 of a corresponding generation from the replication data storage area 100 of the pool volume 40 when there is a read request from the host system 2 without deleting the replication data newly stored in the replication data storage area 100 of the pool volume 40.

(2) SECOND EMBODIMENT (2-1) Configuration of Storage System 120 in Second Embodiment Next, the configuration of a storage system 120 according to the second embodiment is shown. This storage system 120 is configured the same as the storage system 1 according to the foregoing first embodiment other than that a pool volume 130 of a storage apparatus 121 is configured from a first replication data storage area 140 and a second replication data storage area 150; the replication data management table 90 manages the replication data stored in a second replication data storage area 150; and control processing upon reading data is performed by the disk adapter 15 executing the replication data management program 160 illustrated in FIG. 3.

(2-2) Control Processing at Time of Reading Data in Second Embodiment

Next, the control processing at the time of reading data in the storage system 120 according to the second embodiment is explained.

Figure 8:
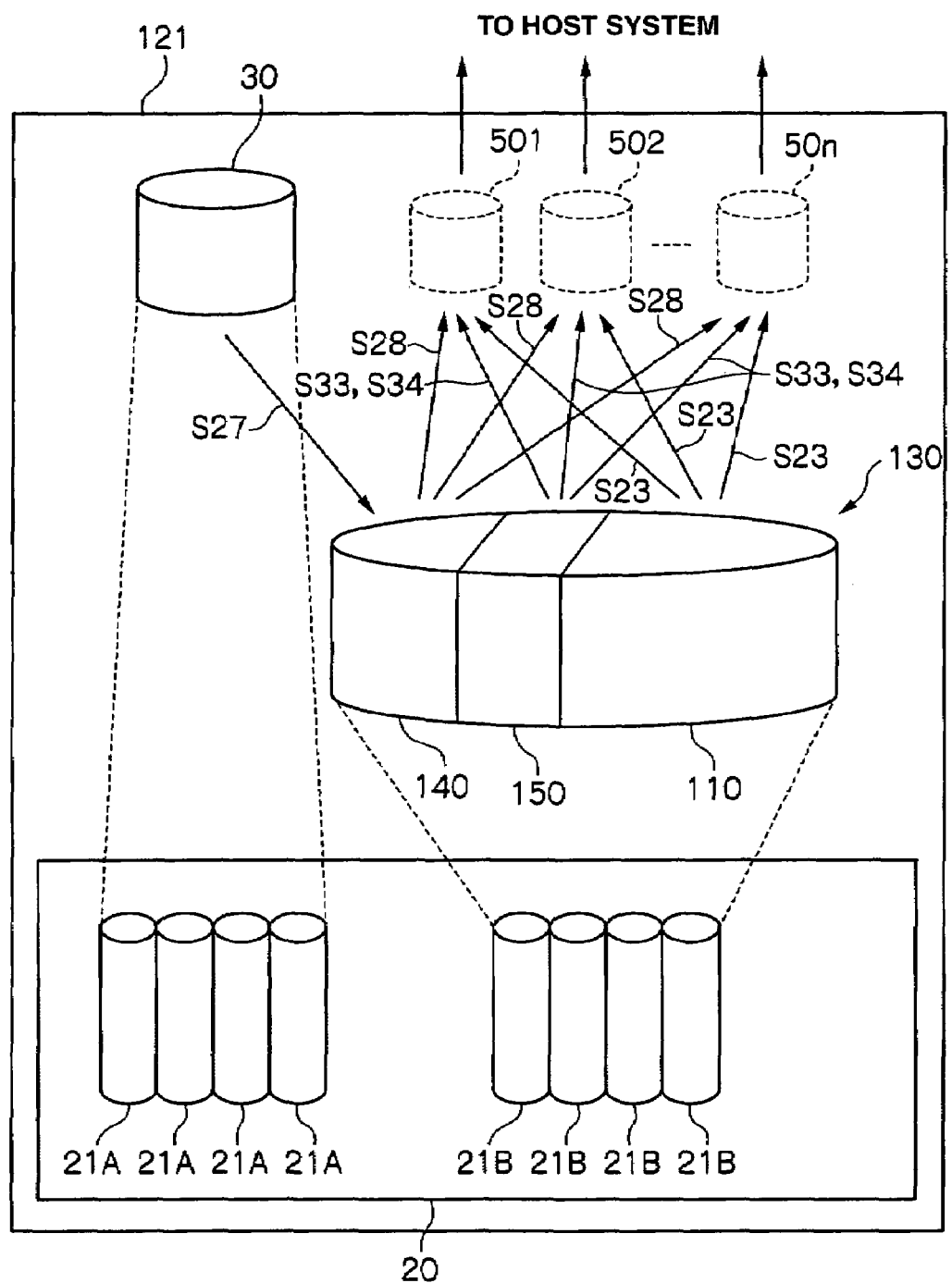
FIG. 8 is a conceptual diagram for explaining the control processing at the time of reading data according to the second embodiment.

FIG. 8 is a conceptual diagram schematically showing the contents of the control processing at the time of reading data in the second embodiment. In this case, pool volume 130, as shown in FIG. 8, is configured from a first replication data storage area 140 for storing new replication data, a second replication data storage area 150 for storing replication data when such replication stored in the first storage area 140 is to be reread, and a differential data storage area 110 for storing differential data, and the capacity of the first replication data storage area 140 and second replication data storage area 150 is configured to be a predetermined capacity by the administrator or the like of the management terminal 16.

Incidentally, the capacity of the first replication data storage area 140 and second replication data storage area 150 can be configured to be an arbitrary capacity by the administrator or the like of the management terminal 16, and the capacity can thereby be applied to various modes of use intended by the administrator or the like.

Figure 9:
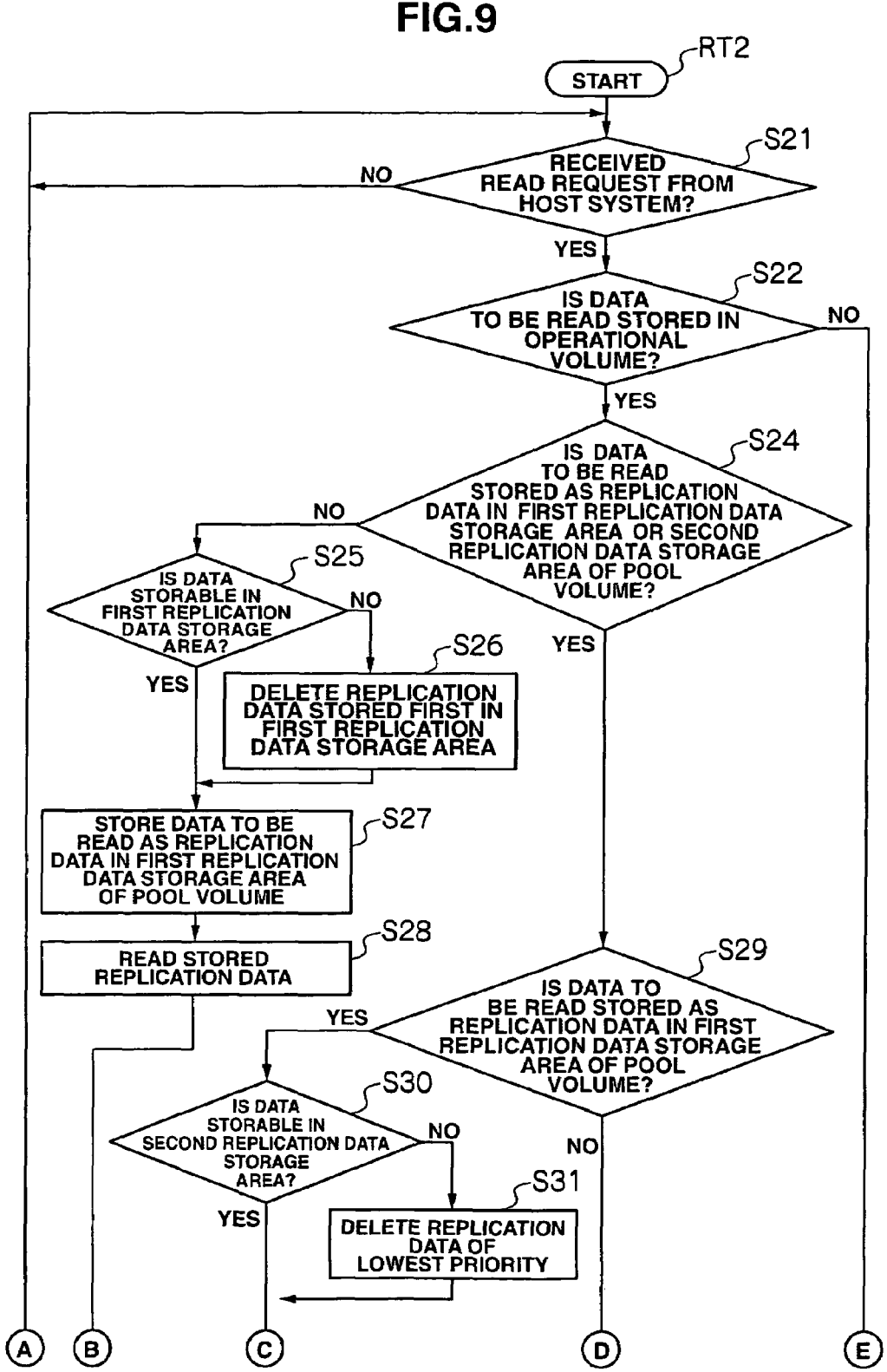
FIG. 9 is a flowchart for explaining the control processing at the time of reading data according to the second embodiment.
Figure 10:
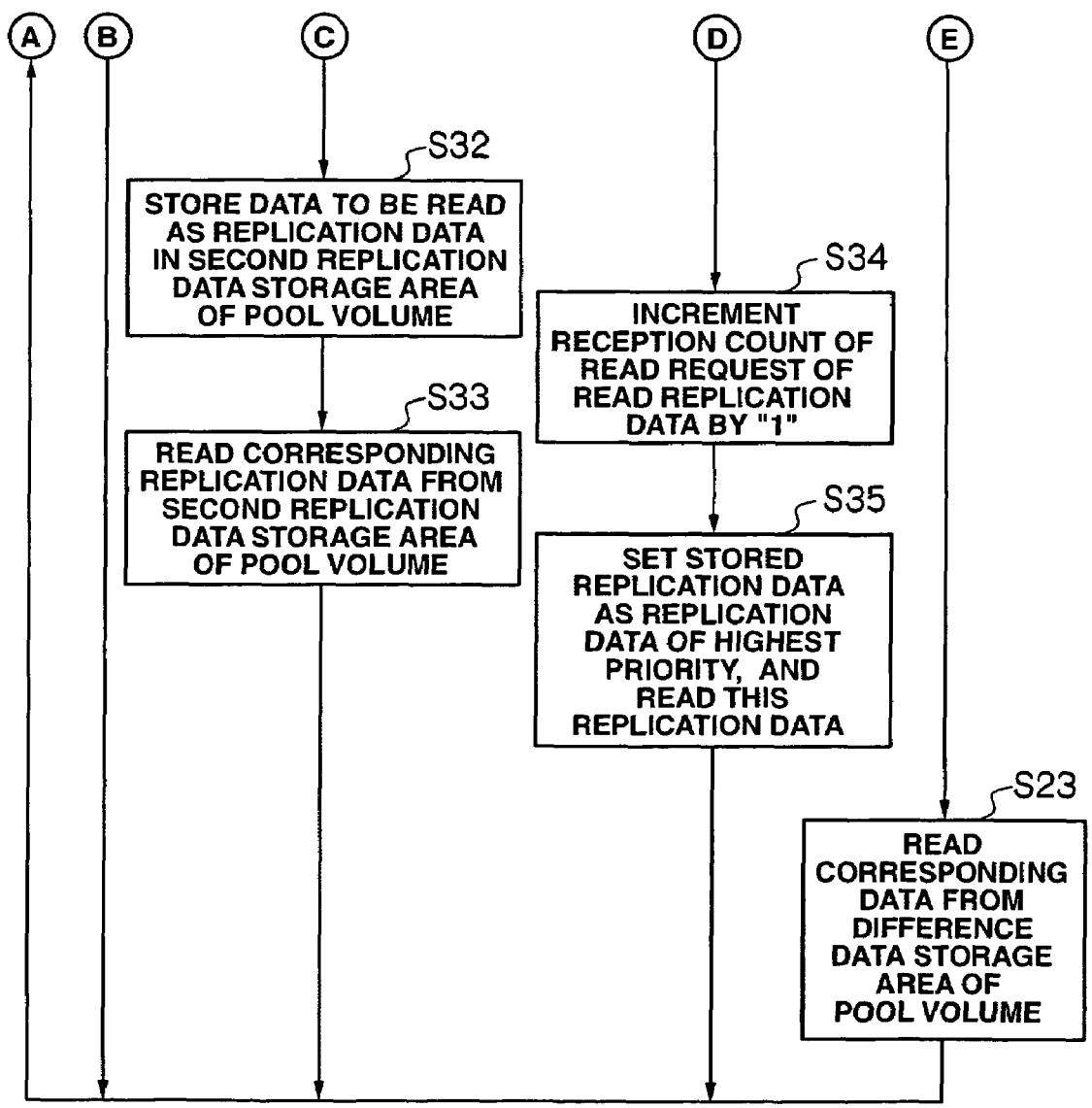
FIG. 10 is a flowchart for explaining the control processing at the time of reading data according to the second embodiment.

Here, FIG. 9 and FIG. 10 are flowcharts showing a specific processing routine of the storage apparatus 121 regarding the controller processing at the time of reading data in the storage system 120.

As a result of initially executing the replication data management program 160, the disk adapter 15 waits in standby mode for the user to operate the host system 2 and to receive a read request of data of the virtual volume 50 of a certain generation according to the second replication data management processing routine RT2 shown in FIG. 9 and FIG. 10 (S21).

When the disk adapter 15 eventually receives a read request of data of the virtual volume 50 of a certain generation from the host system 2 (S21: YES), it checks whether data to be read corresponding to the read request is stored in the operational volume 30 by referring to the snapshot management table 80 (S22).

And, when data to be read of the virtual volume 50 of a generation corresponding to a read request from the host system 2 is not stored in the operational volume 30 (S22: NO), the disk adapter 15 reads data of a number of a block address of the virtual volume 50 of a corresponding generation of the snapshot management table 80 (differential data stored in a number of a corresponding block address of the differential data storage area 110 of the pool volume 130) to the host system 2 (S23), and thereafter once again returns to standby mode and waits to receive a read request of data of the virtual volume 50 of a certain generation from the host system 2 (S21).

Contrarily, when data to be read of the virtual volume 50 of a generation corresponding to a read request from the host system 2 is stored in the operational volume 30 (S22: YES), the disk adapter 15 checks whether data to be read of the virtual volume 50 of a generation corresponding to a read request from the host system 2 is stored as replication data in the first replication data storage area 140 or second replication data storage area 150 of the pool volume 130 (in other words, whether to newly store data to be read as replication data in the first replication data storage area 140 of the pool volume 130) by referring to the first replication data storage area 140 and replication data management table 90 (S24).

And, when data to be read of the virtual volume 50 of a generation corresponding to a read request from the host system 2 is not stored as replication data in the first replication data storage area 140 or second replication data storage area 150 of the pool volume 130 (S24: NO), the disk adapter 15 checks whether the data to be read of the virtual volume 50 of a generation corresponding to a read request from the host system 2 can be stored as replication data in the first replication data storage area 140 of the pool volume 130 (S25).

And, when the data to be read of the virtual volume 50 of a generation corresponding to a read request from the host system 2 cannot be stored as replication data in the first replication data storage area 140 of the pool volume 130 (S25: NO), the disk adapter 15 deletes the replication data that was first stored among the replication data stored in the first replication data storage area 140 (S26).

Contrarily, when the data to be read of the virtual volume 50 of a generation corresponding to a read request from the host system 2 can be stored as replication data in the first replication data storage area 140 of the pool volume 130 (S25: YES), or the replication data that was first stored among the replication data stored in the first replication data storage area 140 has been deleted (S26), the disk adapter 15 stores such data to be read as replication data in the first replication data storage area 140 of the pool volume 130 (S27).

Then, the disk adapter 15 reads the data of a number of a block address of the virtual volume 50 of a corresponding generation stored as replication data in the first replication data storage area 140 of the pool volume 130 to the host system 2 (S28), and thereafter once again returns to standby mode and waits to receive a read request of data of the virtual volume 50 of a certain generation from the host system 2 (S21).

Contrarily, when data to be read of the virtual volume 50 of a generation corresponding to a read request from the host system 2 is stored as replication data in the first replication data storage area 140 or second replication data storage area 150 of the pool volume 130 (S24: YES), the disk adapter 15 checks whether the data to be read of the virtual volume 50 of a generation corresponding to a read request from the host system 2 is stored as replication data in the first replication data storage area 140 of the pool volume 130 (S29).

And, when the data to be read of the virtual volume 50 of a generation corresponding to a read request from the host system 2 is stored as replication data in the first replication data storage area 140 of the pool volume 130 (S29: YES), the disk adapter 15 checks whether this replication data can be stored in the second replication data storage area 150 of the pool volume 130 (S30).

In addition, when this replication data cannot be stored in the second replication data storage area 150 of the pool volume 130 (S30: NO), the disk adapter 15 deletes the replication data with the lowest priority by referring to the replication data management table 90 (S31).

Contrarily, when this replication data can be stored in the second replication data storage area 150 of the pool volume 130 (S30: YES), or the replication data with the lowest priority has been deleted by referring to the replication data management table 90 (S31), the disk adapter 15 stores this replication data in the second replication data storage area 150 of the pool volume 130 (S32).

Then, the disk adapter 15 makes the data of a number of a block address of the virtual volume 50 of a corresponding generation stored as replication data in the second replication data storage area 150 of the pool volume 130 a replication data with the highest priority, reads this replication data to the host system 2 (S33), and thereafter once again returns to standby mode and waits to receive a read request of data of the virtual volume 50 of a certain generation from the host system 2 (S21).

Contrarily, when the data to be read of the virtual volume 50 of a generation corresponding to a read request from the host system 2 is not stored as replication data in the first replication data storage area 140 of the pool volume 130 (S29: NO), this shows that the replication data is stored in the second replication data storage area 150 of the pool volume 130, and the disk adapter 15 reads the data of a number of a block address of the virtual volume 50 of a corresponding generation of the replication data management table 90 (replication data stored in a number of a corresponding block address of the second replication data storage area 150 of the pool volume 130 の) to the host system 2 (S34).

Next, the disk adapter 15 increments the reception count of read requests from the host system 2 for reading data of a number of a block address of the virtual volume 50 of a corresponding generation stored in the read request count storage column 92 of the replication data management table 90 (replication data stored in a number of a corresponding block address of the second replication data storage area 150 of the pool volume 130) by "1" (S35), and thereafter once again returns to standby mode and waits to receive a read request of data of the virtual volume 50 of a certain generation from the host system 2 (S21).

Like this, with the storage apparatus 121, when the data to be read of the virtual volume 50 of a generation corresponding to a read request from the host system 2 is stored in the operational volume 30, it stores the data to be read of the volume 50 of a generation corresponding to a read request from the host system 2 as replication data in the first replication data storage area 140 or second replication data storage area 150 of the pool volume 130, and, when a read request is issued from the host system 2 once again, reads the data to be read of the virtual volume 50 of a corresponding generation from the first replication data storage area 140 or second replication data storage area 150 of the pool volume 130.

Therefore, with the storage apparatus 121, since the data to be read of the virtual volume 50 of a generation corresponding to a read request from the host system 2 stored in the operational volume 30 is read from the first replication data storage area 140 or second replication data storage area 150 of the pool volume 130, it is possible to effectively prevent the increase of access to the operational volume 30, and, as a result, the access load on the operational volume can be dramatically reduced.

Moreover, with the storage apparatus 121, as a result of the replication data management table 90 managing the replication data stored in the second replication data storage area 150, configuring priority for each piece of information of replication data stored in the replication data information storage column 91, and increasing the priority of the replication data the more receptions of read requests from the host system 2 for reading the data stored in the operational volume 30, based on such priority, it is possible to comprehend the frequency of reading the replication data stored in the second replication data storage area 150 of the pool volume 130, and the capacity of the second replication data storage area 150 of the pool volume 130 can be used effectively.

Moreover, with the storage apparatus 121, when the data to be read of the virtual volume 50 of a generation corresponding to a read request from the host system 2 cannot be stored as replication data in the first replication data storage area 140 of the pool volume 130, by deleting the replication data that was stored first among the replication data stored in the first replication data storage area 140, it is possible to delete the oldest replication data stored in the first replication data storage area 140 of the pool volume 130, and the capacity of the first replication data storage area 140 of the pool volume 130 can be used even more effectively.

Moreover, with the storage apparatus 121, when the data to be read of the virtual volume 50 of a generation corresponding to a read request from the host system 2 cannot be stored as replication data in the second replication data storage area 150 of the pool volume 130, by deleting the replication with the lowest priority by referring to the replication data management table 90, it is possible to delete the replication data stored in the second replication data storage area 150 of the pool volume 130 which is hardly read, and the capacity of the second replication data storage area 150 of the pool volume 130 can be used even more effectively.

(3) THIRD EMBODIMENT (3-1) Configuration of Storage System 170 in Third Embodiment Next, the configuration of a storage system 170 according to the third embodiment is shown. This storage system 170 is configured the same as the storage system 1 according to the foregoing first embodiment other than that the replication data management table 90 of a storage apparatus 171 manages the data stored in the operational volume 30; and control processing upon reading data is performed by the disk adapter 15 executing the replication data management program 180 illustrated in FIG. 3.

(3-2) Control Processing at Time of Reading Data in Third Embodiment

Next, the control processing at the time of reading data in the storage system 170 according to the third embodiment is explained. With the storage system 170 according to the third embodiment, the replication data management table manages the frequency of reading the corresponding data from the operational volume in a prescribed period upon receiving a read request regarding data stored in the operational volume of a certain generation from the host system, and a prescribed number of data with high priority stored in the operational volume is stored as the replication data in the pool volume after the lapse of the prescribed period, and the replication data stored in the pool volume is read upon rereading the data stored in the operational volume.

Figure 11:
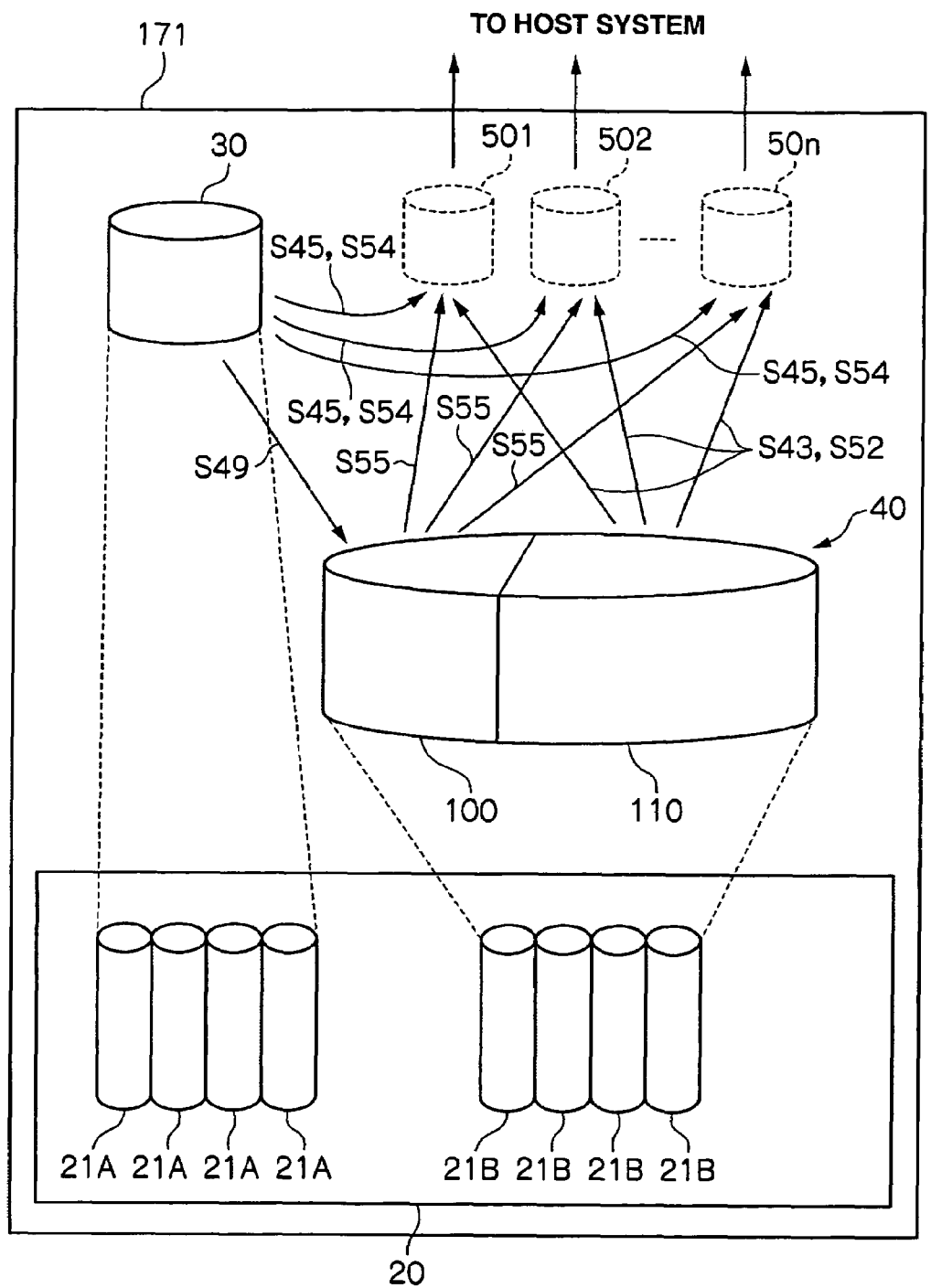
FIG. 11 is a flowchart for explaining the control processing at the time of reading data according to the third embodiment.

FIG. 11 is a conceptual diagram schematically showing the contents of the control processing at the time of reading data in the third embodiment. Further, FIG. 12 and FIG. 13 are flowcharts showing a specific processing routine of the storage apparatus 171 regarding the controller processing at the time of reading data in the storage system 170.

Figure 12:
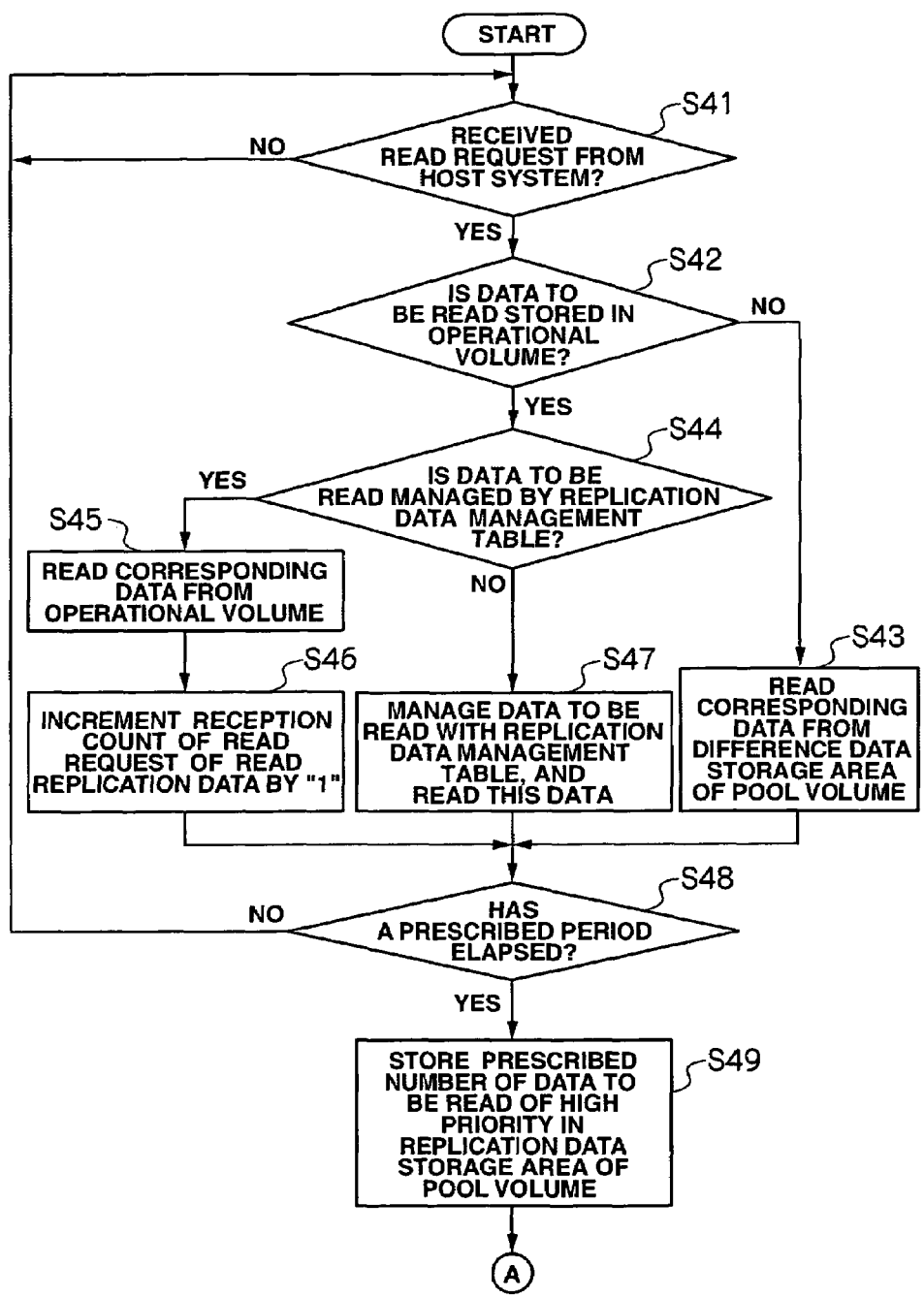
FIG. 12 is a flowchart for explaining the control processing at the time of reading data according to the third embodiment.
Figure 13:
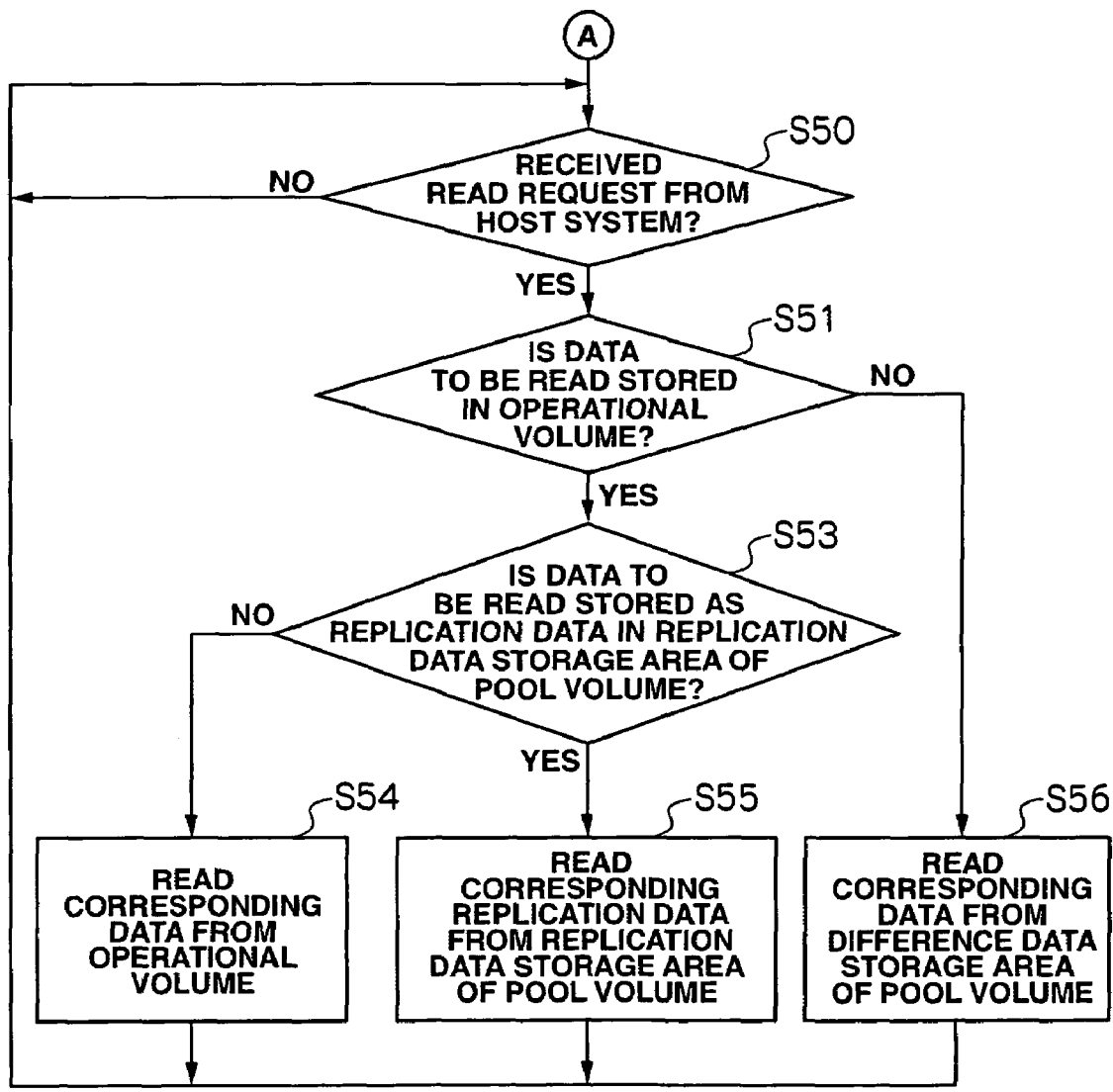
FIG. 13 is a flowchart for explaining the control processing at the time of reading data according to the third embodiment.

As a result of initially executing the replication data management program 180, the disk adapter 15 waits in standby mode for the user to operate the host system 2 and to receive a read request of data of the virtual volume 50 of a certain generation according to the third replication data management processing routine RT3 shown in FIG. 12 and FIG. 13 (S41).

When the disk adapter 15 eventually receives a read request of data of the virtual volume 50 of a certain generation from the host system 2 (S41: YES), it checks whether data to be read corresponding to the read request is stored in the operational volume 30 by referring to the snapshot management table 80 (S42).

And, when data to be read of the virtual volume 50 of a generation corresponding to a read request from the host system 2 is not stored in the operational volume 30 (S42: NO), the disk adapter 15 reads data of a number of a block address of the virtual volume 50 of a corresponding generation of the snapshot management table 80 (differential data stored in a number of a corresponding block address of the differential data storage area 110 of the pool volume 40) to the host system 2 (S43).

Contrarily, when data to be read of the virtual volume 50 of a generation corresponding to a read request from the host system 2 is stored in the operational volume 30 (S42: YES), the disk adapter 15 checks whether data to be read of the virtual volume 50 of a generation corresponding to a read request from the host system 2 is being managed by the replication data management table 90 by referring to the replication data management table 90 (S44).

And, when the data to be read of the virtual volume 50 of a generation corresponding to a read request from the host system 2 is being managed by the replication data management table 90 (S44: YES), the disk adapter 15 reads the data of a number of a block address of the virtual volume 50 of a corresponding generation stored in the operational volume 30 to the host system 2 (S45).

Next, the disk adapter 15 increments the reception count of read requests from the host system 2 for reading data of a number of a block address of the virtual volume 50 of a corresponding generation stored in the read request count storage column 92 of the replication data management table 90 by "1" (S46).

Contrarily, when the data to be read of the virtual volume 50 of a generation corresponding to a read request from the host system 2 is not being managed by the replication data management table 90 (S44: NO), the disk adapter 15 manages the data to be read of the virtual volume 50 of a generation corresponding to a read request from the host system 2 with the replication data management table 90, and reads the data of a number of a block address of the virtual volume 50 of a corresponding generation to the host system 2 (S47).

Eventually, the disk adapter 15 checks whether a prescribed period preconfigured by the administrator or the like of the management terminal 16 has lapsed from the initial time (S48). And, when a prescribed period preconfigured by the administrator or the like of the management terminal 16 has not lapsed from the initial time (S48: NO), the disk adapter 15 thereafter once again returns to standby mode and waits to receive a read request of data of the virtual volume 50 of a certain generation from the host system 2 (S41). Contrarily, when a prescribed period preconfigured by the administrator or the like of the management terminal 16 has lapsed from the initial time (S48: YES), the disk adapter 15 stores a prescribed number of data with high priority of a number of a block address of the virtual volume 50 of a corresponding generation among the data stored in a number of a block address of the virtual volume 50 of a corresponding generation being managed by the replication data management table 90 in the replication data storage area 100 of the pool volume 40 (S49).

Next, the disk adapter 15 waits in standby mode for the user to operate the host system 2 and to receive a read request of data of the virtual volume 50 of a certain generation (S50).

When the disk adapter 15 eventually receives a read request of data of the virtual volume 50 of a certain generation from the host system 2 (S50: YES), it checks whether data to be read corresponding to the read request is stored in the operational volume 30 by referring to the snapshot management table 80 (S51).

And, when data to be read of the virtual volume 50 of a generation corresponding to a read request from the host system 2 is not stored in the operational volume 30 (S51: NO), the disk adapter 15 reads data of a number of a block address of the virtual volume 50 of a corresponding generation of the snapshot management table 80 (differential data stored in a number of a corresponding block address of the differential data storage area 110 of the pool volume 40) to the host system 2 (S52), and thereafter once again returns to standby mode and waits to receive a read request of data of the virtual volume 50 of a certain generation from the host system 2 (S50).

Contrarily, when data to be read of the virtual volume 50 of a generation corresponding to a read request from the host system 2 is stored in the operational volume 30 (S51: YES), the disk adapter 15 checks whether data to be read of the virtual volume 50 of a generation corresponding to a read request from the host system 2 is stored as replication data in the replication data storage area 100 of the pool volume 40 by referring to the replication data management table 90 (S53).

And, when data to be read of the virtual volume 50 of a generation corresponding to a read request from the host system 2 is not stored as replication data in the replication data storage area 100 of the pool volume 40 (S53: NO), the disk adapter 15 reads the data of a number of block address of the virtual volume 50 of a corresponding generation stored in the operational volume 30 (S54), and thereafter once again returns to standby mode and waits to receive a read request of data of the virtual volume 50 of a certain generation from the host system 2 (S50).

Contrarily, when data to be read of the virtual volume 50 of a generation corresponding to a read request from the host system 2 is stored as replication data in the replication data storage area 100 of the pool volume 40 (S53: YES), the disk adapter 15 reads the data of a number of a block address of the virtual volume 50 of a corresponding generation of the replication data management table 90 (replication data stored in a number of a corresponding block address of the replication data storage area 100 of the pool volume 40) to the host system 2 (S55), and thereafter once again returns to standby mode and waits to receive a read request of data of the virtual volume 50 of a certain generation from the host system 2 (S50).

Like this, with the storage apparatus 171, the replication data management table 90 manages the number of times the corresponding data is read from the operational volume 30 in a prescribed period upon receiving a read request regarding data stored in the operational volume 30 of a certain generation from the host system 2, and a prescribed number of data with high priority stored in the operational volume 30 is stored as the replication data in the pool volume after the lapse of the prescribed period, and the replication data stored in the replication data storage area 100 of the pool volume 40 is read upon rereading the data stored in the operational volume 30.

Therefore, with the storage apparatus 171, since a prescribed number of data with high priority stored in the operational volume 30 is stored as the replication data in the pool volume after the lapse of the prescribed period, and the replication data stored in the replication data storage area 100 of the pool volume 40 is read upon rereading the data stored in the operational volume 30, it is possible to effectively prevent the increase in access to the operational volume 30, and, since the reception count of read requests from the host system 2 does not have to be managed with the replication data management table 90 during operation, it is possible to accelerate the reading to the host system 2, and, as a result, the access load on the operational volume can be dramatically reduced.

In addition to a storage apparatus for acquiring a snapshot image and reading data from such snapshot image, the present invention may also be applied to a storage apparatus for reading data from various types of virtual volumes.

We claim:

1. A storage apparatus having an operational volume for storing data transmitted from a host system, and a pool volume for storing differential data as data before update when said data is to be stored in said operational volume after acquiring a snapshot image of said operational volume, comprising:
   a snapshot acquisition unit for acquiring said snapshot image of said operational volume at a prescribed timing;
   a snapshot management unit for managing the generation of said snapshot image acquired with said snapshot acquisition unit and the storage destination of data of said snapshot image; and
   a controller for controlling, upon receiving a read request regarding data of said snapshot image of a prescribed generation from said host system, the reading of said data of said operational volume or said differential data of said pool volume as data of a snapshot image of a corresponding generation based on the generation of said snapshot and the storage destination of data of said snapshot image managed by said snapshot management unit;
   wherein said controller performs control so as to store said data stored in said operational volume as replication data in said pool volume when reading said data from said operational volume, and read said replication data stored in said pool volume rather than from said operational volume when receiving a request for rereading said data stored in said operational volume to avoid an increase in access to the operational volume, by:
   determining whether a read request has been received from the host system,
   determining if data requested by the read request is stored in the operational volume,
   if the requested data is not stored in the operational volume, reading corresponding data from a differential data storage area of the pool volume,
   if the requested data is stored in the operational volume, determining if the requested data is stored as replication data in a replication data storage area of the pool volume,
   if the requested data is stored as replication data in the pool area, reading the corresponding replication data from the replication data storage area of the pool volume and incrementing a reception count of the read request of the read replication data by "1", and
   if the requested data is not stored as replication data in the pool volume, determining if the requested data is storable in the replication data storage area, and, if so, storing data to be read as replication data in the replication data storage of the pool volume and setting the stored replication data as replication data of highest priority and reading this replication data.

2. The storage apparatus according to claim 1, wherein said pool volume has a replication data storage area for storing said replication data; and
   wherein said replication data storage area is preconfigured with a capacity for storing said replication data.

3. The storage apparatus according to claim 2, further comprising a read request count management unit for managing the number of times said replication data received a read request from said host system,
   wherein said read request count management unit manages said replication data by setting an order of priority in order from the most receptions of read requests from said host system.

4. The storage apparatus according to claim 3, wherein said controller deletes said replication data of the lowest priority managed by said read request count management unit when said replication data stored in said replication data storage area exceeds said capacity.

5. The storage apparatus according to claim 4, wherein said read request count management unit manages said replication data newly stored in said pool volume as said replication data of the highest priority until subsequently a new replication data is stored in said pool volume.

6. The storage apparatus according to claim 3, wherein said replication data storage area has a first storage area for storing said new replication data, and a second storage area for storing said replication data when said replication data stored in said first storage area is reread; and
   wherein said read request count management unit manages said replication data stored in said second storage area by setting an order of priority in order from the most receptions of read requests from said host system.

7. The storage apparatus according to claim 6, wherein said first storage area is preconfigured with a first capacity for storing said replication data; and
   wherein said controller deletes replication data that was first stored in said first storage area among said replication data stored in said first storage area when said replication data stored in said first storage area exceeds said first capacity.

8. The storage apparatus according to claim 6, wherein said second storage area is preconfigured with a second capacity for storing said replication data; and
   wherein said controller deletes said replication data of the lowest priority managed by said read request count management unit when said replication data stored in said second storage area exceeds said second capacity.

9. The storage apparatus according to claim 3, wherein said read request count management unit manages the number of times the corresponding data is to be read from said operational volume in a prescribed period upon receiving a read request regarding said data stored in said operational volume of a prescribed generation from said host system; and wherein said controller controls the storage of a prescribed number of said data with high priority stored in said operational volume as said replication data in said pool volume after the lapse of said prescribed period, and the reading of said replication data stored in said pool volume upon rereading said data stored in said operational volume.

10. A control method of a storage apparatus having an operational volume for storing data transmitted from a host system, and a pool volume for storing differential data as data before update when said data is to be stored in said operational volume after acquiring a snapshot image of said operational volume, comprising:

a first step for acquiring said snapshot image of said operational volume at a prescribed timing;

a second step for managing the generation of said snapshot image acquired at said first step and the storage destination of data of said snapshot image; and a third step for controlling, upon receiving a read request regarding data of said snapshot image of a prescribed generation from said host system, the reading of said data of said operational volume or said differential data of said pool volume as data of a snapshot image of a corresponding generation based on the generation of said snapshot and the storage destination of data of said snapshot image managed at said second step;

wherein at said third step, control is performed so as to store said data stored in said operational volume as replication data in said pool volume when reading said data from said operational volume, and read said replication data stored in said pool volume rather than from said operational volume when receiving a request for rereading said data stored in said operational volume to avoid an increase in access to the operational volume, by:

determining whether a read request has been received from the host system, determining if data requested by the read request is stored in the operational volume, if the requested data is not stored in the operational volume, reading corresponding data from a differential data storage area of the pool volume, if the requested data is stored in the operational volume, determining if the requested data is stored as replication data in a replication data storage area of the pool volume, if the requested data is stored as replication data in the pool area, reading the corresponding replication data from the replication data storage area of the pool volume and incrementing a reception count of the read request of the read replication data by "1", and if the requested data is not stored as replication data in the pool volume, determining if the requested data is storable in the replication data storage area, and, if so, storing data to be read as replication data in the replication data storage of the pool volume and setting the stored replication data as replication data of highest priority and reading this replication data.

11. The control method of a storage apparatus according to claim 10, wherein said pool volume has a replication data storage area for storing said replication data; and wherein said replication data storage area is preconfigured with a capacity for storing said replication data.

12. The control method of a storage apparatus according to claim 11, wherein at said third step, the number of times said replication data received a read request from said host system is managed, and said replication data is managed by setting an order of priority in order from the most receptions of read requests from said host system.

13. The control method of a storage apparatus according to claim 12, wherein at said third step, said replication data of the lowest priority is deleted when said replication data stored in said replication data storage area exceeds said capacity.

14. The control method of a storage apparatus according to claim 13, wherein at said third step, said replication data newly stored in said pool volume is managed as said replication data of the highest priority until subsequently a new replication data is stored in said pool volume.

15. The control method of a storage apparatus according to claim 12, wherein said replication data storage area has a first storage area for storing said new replication data, and a second storage area for storing said replication data when said replication data stored in said first storage area is reread; and wherein, at said third step, said replication data stored in said second storage area is managed by setting an order of priority in order from the most receptions of read requests from said host system.

16. The control method of a storage apparatus according to claim 15, wherein said first storage area is preconfigured with a first capacity for storing said replication data; and wherein, at said third step, replication data that was first stored in said first storage area among said replication data stored in said first storage area is deleted when said replication data stored in said first storage area exceeds said first capacity.

17. The control method of a storage apparatus according to claim 15, wherein said second storage area is preconfigured with a second capacity for storing said replication data; and wherein, at said third step, said replication data of the lowest priority is deleted when said replication data stored in said second storage area exceeds said second capacity.

18. The control method of a storage apparatus according to claim 15, wherein, at said third step, upon receiving a read request regarding said data stored in said operational volume of a prescribed generation from said host system, the number of times the corresponding data is to be read from said operational volume in a prescribed period is managed, a prescribed number of said data with high priority stored in said operational volume is stored as said replication data in said pool volume after the lapse of said prescribed period, and said replication data stored in said pool volume is read upon rereading said data stored in said operational volume.

* * * * *